(12) United States Patent
Scott

(10) Patent No.: US 9,979,991 B2
(45) Date of Patent: May 22, 2018

(54) METHOD AND APPARATUS FOR DETERMINISTIC DATE AND TIME ALIGNMENT OF MEDIA SIGNALS AND GENERATION OF TIME-RELATED LABELS

(71) Applicant: SKOTEL CORPORATION, Brossard (CA)

(72) Inventor: Stephen C. Scott, Brossard (CA)

(*) Notice: Subject to any disclaimer, the term of this patent is extended or adjusted under 35 U.S.C. 154(b) by 260 days.

(21) Appl. No.: 14/943,790

(22) Filed: Nov. 17, 2015

(65) Prior Publication Data

US 2016/0142756 A1   May 19, 2016

Related U.S. Application Data

(60) Provisional application No. 62/080,753, filed on Nov. 17, 2014.

(51) Int. Cl.
*H04N 21/262* (2011.01)
*H04N 21/242* (2011.01)
*H04N 21/8547* (2011.01)

(52) U.S. Cl.
CPC ..... *H04N 21/26241* (2013.01); *H04N 21/242* (2013.01); *H04N 21/26283* (2013.01); *H04N 21/8547* (2013.01)

(58) Field of Classification Search
None
See application file for complete search history.

(56) References Cited

U.S. PATENT DOCUMENTS

| | | | |
|---|---|---|---|
| 6,191,821 B1 | 2/2001 | Kupnicki | |
| 6,546,190 B1 | 4/2003 | Phillips et al. | |
| 6,834,083 B1 | 12/2004 | Tahara et al. | |
| 6,980,731 B1 | 12/2005 | Tahara et al. | |

(Continued)

FOREIGN PATENT DOCUMENTS

| EP | 0710021 | 8/1997 |
|---|---|---|
| WO | WO 20020232148 | 4/2002 |

(Continued)

OTHER PUBLICATIONS

Briscoe, "The Networked Infrastructure: Genlock and 10 Gb Ethernet"; Apr. 2013.*

(Continued)

*Primary Examiner* — Pankaj Kumar
*Assistant Examiner* — Usha Raman
(74) *Attorney, Agent, or Firm* — Benoit & Cote, Inc.; C. Marc Benoit

(57) ABSTRACT

There is described a method for generating a frame label for a media frame sampled at a media frame rate at a given time-of-day relative to a day-zero reference. The method comprises: obtaining a calendar day at which the media frame is sampled, the calendar day having a day origin; computing a day-origin phase offset at the day origin based on the day-zero reference and on the calendar day; subtracting the day-origin phase offset from the given time-of-day to get a media frame relative offset which is relative to a first frame of the calendar day; computing the frame label from the media frame relative offset and from the media frame rate; and assigning the frame label to the media frame for time-positioning the media frame with respect to other media frames and with respect to a timescale.

19 Claims, 16 Drawing Sheets

(56) References Cited

U.S. PATENT DOCUMENTS

| | | |
|---|---|---|
| 7,024,097 B2 | 4/2006 | Sullivan |
| 7,142,775 B2 | 11/2006 | Sullivan |
| 7,167,633 B2 | 1/2007 | Sullivan |
| 7,181,124 B2 | 2/2007 | Sullivan |
| 7,187,845 B2 | 3/2007 | Sullivan |
| 7,248,779 B2 | 7/2007 | Sullivan |
| 7,903,694 B2 | 3/2011 | Defrance et al. |
| 8,095,615 B2 | 1/2012 | Briscoe et al. |
| 8,767,778 B2 | 7/2014 | Briscoe et al. |
| 2012/0128061 A1 | 5/2012 | Labrozzi et al. |
| 2015/0281752 A1* | 10/2015 | Van Veldhuisen . H04N 21/2368 725/116 |

FOREIGN PATENT DOCUMENTS

| | | |
|---|---|---|
| WO | WO 2004056126 | 7/2004 |
| WO | WO 2010062596 | 6/2010 |

OTHER PUBLICATIONS

Kojima et al., "A Practical Approach to IP Live Production", Nov. 2014.*
SMPTE Standard ST 2059-2:2015, Mar. 2015.*
SMPTE Standard ST 2059-1:2015, Mar. 2015.*
Wadge, "Media Synchronisation in the IP Studio", Jul. 2015.*
Nigel Seth Smith, "Network-Based Timing, Genlock and Time Code", Mar. 2015.*
SMPTE Guideline EG 35:2012, Oct. 2012.*
SMPTE Standard ST 309 Transmission of Date and Time Zone Information in Binary Groups of Time and Control Code, Oct. 5, 2012.
SMPTE Standard ST-2 Transmission of Time Code in the Ancillary Data Space, Jul. 14, 2009.
SMPTE Standart ST 12-1 Time and Control Code, Feb. 7, 2008.

* cited by examiner

Figure 1

| Index | Media Rate = 30/1.001 Hz - Two Frame CFID Alignment | | |
|---|---|---|---|
| | Second | | |
| | Phase Accumulation 29.970029 Frames per | Frame Block Offset | Phase Number |
| 0 | 0.000000 | 0.000000 | 0 |
| 267 | 8001.998001 | 0.001998 | 1 |
| 534 | 16003.996003 | 0.003996 | 2 |
| 801 | 24005.994005 | 0.005994 | 3 |
| 67 | 2007.992007 | 0.007992 | 4 |
| 334 | 10009.990009 | 0.009990 | 5 |
| 601 | 18011.988011 | 0.011988 | 6 |
| 868 | 26013.986013 | 0.013986 | 7 |
| 134 | 4015.984015 | 0.015984 | 8 |
| 401 | 12017.982017 | 0.017982 | 9 |
| 668 | 20019.980019 | 0.019980 | 10 |
| | | | |
| 667 | 19990.009990 | 1.990009 | 996 |
| 934 | 27992.007992 | 1.992007 | 997 |
| 200 | 5994.005994 | 1.994005 | 998 |
| 467 | 13996.003996 | 1.996003 | 999 |
| 734 | 21998.001998 | 1.998001 | 1000 |
| 1001 | 30000.000000 | 0.000000 | 0 |

*Figure 2*

| Index | Phase Accumulation 2589410.589410 Frames per day | Frame Block Offset | Frame Block Offset at 24h | Daily Count Correction | Phase Number |
|---|---|---|---|---|---|
| 0 | 0.000000 | 0.000000 | 2.589410 | 4 | 0 |
| 1 | 2589410.589410 | 1.410589 | 1.178821 | 2 | 706 |
| 2 | 5178821.178821 | 0.821178 | 1.768231 | 2 | 411 |
| 3 | 7768231.768231 | 0.231768 | 2.357642 | 4 | 116 |
| 4 | 10357642.357642 | 1.642357 | 0.947052 | 2 | 822 |
| 5 | 12947052.947052 | 1.052947 | 1.536463 | 2 | 527 |
| 6 | 15536463.536463 | 0.463536 | 2.125874 | 4 | 232 |
| 7 | 18125874.125874 | 1.874125 | 0.715284 | 2 | 938 |
| 8 | 20715284.715284 | 1.284715 | 1.304695 | 2 | 643 |
| 9 | 23304695.304695 | 0.695304 | 1.894105 | 2 | 348 |
| 10 | 25894105.894105 | 0.105894 | 2.483516 | 4 | 53 |
| 996 | 2579052947.052950 | 0.947052 | 1.642357 | 2 | 474 |
| 997 | 2581642357.642360 | 0.357642 | 2.231768 | 4 | 179 |
| 998 | 2584231768.231770 | 1.768231 | 0.821178 | 2 | 885 |
| 999 | 2586821178.821180 | 1.178821 | 1.410589 | 2 | 590 |
| 1000 | 2589410589.410590 | 0.589410 | 1.999999 | 2 | 295 |
| 1001 | 2592000000.000000 | 0.000000 | | | 0 |

Media Rate = 30/1.001 Hz - Two Frame CFID Alignment Day

*Figure 3*

| | |
|---|---|
| Phase-Number for Seconds | Equation 02 |
| Phase-Number() = (Index x 15) % 1001 <br> where: Index is count of seconds from zero phase alignment point. | |
| Note: The following formulae for minutes and hours presumes a timescale that is uninterrupted by the insertion of leap seconds or standard / daylight saving time shifts. | |
| Phase-Number for Minutes | Equation 04 |
| Phase-Number() = (Index x 900) % 1001 <br> ;\\ where: Index is count of minutes from zero phase alignment point. | ;\\ |
| Phase-Number for Hours | Equation 06 |
| Phase-Number() = (Index x 947) % 1001 <br> ;\\ where: Index is count of hours from zero phase alignment point. | ;\\ |
| Phase-Number for Days | Equation 08 |
| Phase-Number() = (Index x 706) % 1001 <br> ;\\ where: Index is count of days from zero phase alignment point. | ;\\ |
| Phase Alignment, UTC Midnight to Frame Zero | Equation 10 |
| Phase-Number(UTC_Midnight) = <br> (Origin_Offset x 15 <br> + Days x 706 <br> + (Leap_Seconds − 10) x 15 <br> ) % 1001 | ;// Phase-Number in UTC time zoneat midnight <br> ;\\ Seconds offset from Epoch to Day-Zero <br> ;\\ Count of days since Day-Zero <br> ;\\ Accumulated Leap Seconds <br> ;\\ Modulus 1001 operation |
| Phase Alignment, UTC Offset Midnight to Frame Zero | Equation 12 |
| Phase-Number(Local_Midnight) = <br> Phase-Number(UTC_Midnight) <br> + UTC_Offset_SIGN x ( <br> (ABS(Hours) x (1001 − 947)) % 1001 <br> + (ABS(Minutes) x (1001 − 900) % 1001) | ;\\ Phase-Number in local time zone at midnight <br> ;\\ Phase-Number calculated at UTC midnight <br> ;\\ SIGN = −1 for negative UTC Offsets <br> ;\\ UTC Local Offset Hours <br> ;\\ UTC Local Offset Miiutes |
| Phase Alignment, Time-of-Day to Frame Block | Equation 14 |
| Phase-Number() = <br> (Phase-Number(Midnight) <br> + Hours x 947 <br> + Minutes x 900 <br> + Seconds x 15 <br> ) % 1001 | ;\\ Phase number at a time during the day <br> ;\\ Phase-Number calculated at midnight <br> ;\\ Count of hours since midnight <br> ;\\ Count of minutes since hour <br> ;\\ Count of seconds since minute <br> ;\\ Modulus 1001 operation |
| Frames Offset Value from Phase-Number | Equation 16 |
| Frame_Offset = <br> Phase-Number x (2 / 1001) <br> Note: There are 2 frames in Frame Block | ;\\ Phase-Offset in frames <br> ;\\ value in frames <br> ;\\ 2 / 1001 = 0.001998 |
| Seconds Offset Value from Phase-Number | Equation 18 |
| Seconds_Offset = <br> Phase-Number x (2 / 30000) <br> Note: There are 2 frames in Frame Block | ;\\ Phase-Offset in seconds <br> ;\\ value in seconds <br> ;\\ |
| Ten-field sequence index from Phase-Number | Equation 20 |
| Ten-field-index = <br> (Phase-Number x 4 <br> ) % 10 | ;\\ Ten-field sequence index <br> ;\\ Four fields in a frame block <br> ;\\ Modulo 10 operation |

| Calendar Date | Leap Seconds in Effect | Days since Epoch | Seconds since Epoch | Media Alignment Epoch = 1970-01-01T00:00:00 (TAI) | | | |
|---|---|---|---|---|---|---|---|
| | | | | Rate = 30/1.001 Hz, 2-Frame Block Alignment | | | |
| | | | | Phase Number | FrameTimeOffset | | First Frame of Day |
| | | | | | [Frames] | [Seconds] | |
| PTP Epoch | | | 0 | 0 | 0.000000 | 0.000000 | |
| 1970-01-01 | 10 | 0 | 10 | 150 | 0.299700 | 0.010000 | 300 |
| 1972-01-01 | 10 | 730 | 63072010 | 15 | 0.029970 | 0.001000 | 1890270030 |
| 1972-07-01 | 11 | 911 | 78796811 | 394 | 0.787212 | 0.026266 | 2361542788 |
| 1973-01-01 | 12 | 1095 | 94694412 | 183 | 0.365634 | 0.012200 | 2837984366 |
| 1974-01-01 | 13 | 1460 | 126230413 | 631 | 1.260739 | 0.042066 | 3783129262 |
| 1975-01-01 | 14 | 1825 | 157766414 | 78 | 0.155844 | 0.005200 | 4728264156 |
| 1976-01-01 | 15 | 2190 | 189302415 | 526 | 1.050949 | 0.035066 | 5673399052 |
| 1977-01-01 | 16 | 2556 | 220924816 | 679 | 1.356643 | 0.045266 | 6621123358 |
| 1978-01-01 | 17 | 2921 | 252460817 | 126 | 0.251748 | 0.008400 | 7566258252 |
| 1979-01-01 | 18 | 3286 | 283996818 | 574 | 1.146853 | 0.038266 | 8511393148 |
| 1980-01-01 | 19 | 3651 | 315532819 | 21 | 0.041958 | 0.001400 | 9456528042 |
| 1981-07-01 | 20 | 4198 | 362793620 | 833 | 1.664335 | 0.055533 | 10872935686 |
| 1982-07-01 | 21 | 4563 | 394329621 | 280 | 0.559440 | 0.018666 | 11818070560 |
| 1983-07-01 | 22 | 4928 | 425865622 | 728 | 1.454545 | 0.048533 | 12763205456 |
| 1985-07-01 | 23 | 5659 | 489024023 | 313 | 0.625374 | 0.020866 | 14653064626 |
| 1988-01-01 | 24 | 6573 | 567993624 | 968 | 1.934065 | 0.064533 | 17022785936 |
| 1990-01-01 | 25 | 7304 | 631152025 | 553 | 1.104895 | 0.036866 | 18915645106 |
| 1991-01-01 | 26 | 7669 | 662688026 | 0 | 0.000000 | 0.000000 | 19860780000 |
| 1992-07-01 | 27 | 8216 | 709948827 | 812 | 1.622377 | 0.054133 | 21277187624 |
| 1993-07-01 | 28 | 8581 | 741484828 | 259 | 0.517482 | 0.017266 | 22222322518 |
| 1994-07-01 | 29 | 8946 | 773020829 | 707 | 1.412587 | 0.047133 | 23167457414 |
| 1996-01-01 | 30 | 9495 | 820454430 | 929 | 1.856143 | 0.061933 | 24589043858 |
| 1997-07-01 | 31 | 10042 | 867715231 | 740 | 1.478521 | 0.049333 | 26006451480 |
| 1999-01-01 | 32 | 10591 | 915148832 | 962 | 1.922077 | 0.064133 | 27427037924 |
| 2006-01-01 | 33 | 13148 | 1136073633 | 415 | 0.829170 | 0.027666 | 34048160830 |
| 2009-01-01 | 34 | 14244 | 1230768034 | 433 | 0.865134 | 0.028866 | 36886154866 |
| 2012-07-01 | 35 | 15521 | 1341100835 | 109 | 0.217782 | 0.007266 | 40192832218 |
| t.b.a. | 36 | | | | | | |

*Figure 7*

| Calendar Date | Leap Seconds in Effect | Days since Epoch | Seconds since Epoch | Media Alignment Epoch = 1972-01-01T00:00:00Z (UTC) Rate = 30/1.001 Hz, 2-Frame Block Alignment ||||
|---|---|---|---|---|---|---|---|
| | | | | Phase Number | FrameTimeOffset [Frames] | FrameTimeOffset [Seconds] | First Frame of Day |
| 1972-01-01 | 10 | 0 | 0 | 0 | 0.000000 | 0.000000 | 0 |
| 1972-07-01 | 11 | 182 | 15724801 | 379 | 0.757242 | 0.025266 | 471272758 |
| 1973-01-01 | 12 | 366 | 31622402 | 168 | 0.335664 | 0.011200 | 947724336 |
| 1974-01-01 | 13 | 731 | 63158403 | 616 | 1.230769 | 0.041066 | 1892859232 |
| 1975-01-01 | 14 | 1096 | 94694404 | 63 | 0.125874 | 0.004200 | 2837994128 |
| 1976-01-01 | 15 | 1461 | 126230405 | 511 | 1.020979 | 0.034066 | 3783129022 |
| 1977-01-01 | 16 | 1827 | 157852806 | 664 | 1.326673 | 0.044266 | 4730853328 |
| 1978-01-01 | 17 | 2192 | 189388807 | 111 | 0.221778 | 0.007400 | 5675988222 |
| 1979-01-01 | 18 | 2557 | 220924808 | 559 | 1.116883 | 0.037266 | 6621123118 |
| 1980-01-01 | 19 | 2922 | 252460809 | 6 | 0.011988 | 0.000400 | 7566258012 |
| 1981-07-01 | 20 | 3469 | 299721610 | 818 | 1.634365 | 0.054533 | 8982665636 |
| 1982-07-01 | 21 | 3834 | 331257611 | 265 | 0.528470 | 0.017666 | 9927800530 |
| 1983-07-01 | 22 | 4199 | 362793612 | 713 | 1.424575 | 0.047533 | 10872935426 |
| 1985-07-01 | 23 | 4930 | 425952013 | 298 | 0.595404 | 0.019866 | 12765794598 |
| 1988-01-01 | 24 | 5844 | 504921614 | 953 | 1.904095 | 0.063533 | 15132515906 |
| 1990-01-01 | 25 | 6575 | 568080015 | 538 | 1.074925 | 0.035866 | 17025375078 |
| 1991-01-01 | 26 | 6940 | 599616016 | 985 | 1.970029 | 0.065733 | 17970509972 |
| 1992-07-01 | 27 | 7487 | 646876817 | 797 | 1.592407 | 0.053133 | 19386917594 |
| 1993-07-01 | 28 | 7852 | 678412818 | 244 | 0.487512 | 0.016266 | 20332052488 |
| 1994-07-01 | 29 | 8217 | 709948819 | 692 | 1.382817 | 0.046133 | 21277187384 |
| 1996-01-01 | 30 | 8766 | 757362420 | 914 | 1.826173 | 0.060933 | 22698773828 |
| 1997-07-01 | 31 | 9313 | 804643221 | 725 | 1.448551 | 0.048333 | 24115181450 |
| 1999-01-01 | 32 | 9862 | 852076822 | 947 | 1.892107 | 0.063133 | 25538767894 |
| 2006-01-01 | 33 | 12419 | 1073001623 | 400 | 0.799200 | 0.026666 | 32157890800 |
| 2009-01-01 | 34 | 13515 | 1167696024 | 418 | 0.835164 | 0.027866 | 34995884836 |
| 2012-07-01 | 35 | 14792 | 1278038825 | 94 | 0.187812 | 0.006266 | 38302562188 |
| t.b.a | 36 | | | | | | |

*Figure 8*

| UTC Offset | | | Frames Offset | |
|---|---|---|---|---|
| Hours | Minutes | Phase Number | Integer Frames | Fractional Frames |
| 14 | 0 | 756 | 1510488 | 1.510489 |
| 13 | 45 | 1243 | 1483516 | 2.483516 |
| 13 | 30 | 729 | 1456543 | 1.456543 |
| 13 | 15 | 1216 | 1429568 | 2.429570 |
| 13 | 0 | 702 | 1402596 | 1.402597 |
| 12 | 45 | 1189 | 1375622 | 2.375622 |
| 12 | 30 | 675 | 1348650 | 1.348651 |
| 12 | 15 | 1162 | 1321676 | 2.321678 |
| 12 | 0 | 648 | 1294704 | 1.294705 |
| 11 | 45 | 1135 | 1267730 | 2.267732 |
| 11 | 30 | 621 | 1240758 | 1.240759 |
| 11 | 15 | 1108 | 1213784 | 2.213786 |
| 11 | 0 | 594 | 1186812 | 1.186813 |
| 10 | 45 | 1081 | 1159838 | 2.159840 |
| 10 | 30 | 567 | 1132866 | 1.132867 |
| 10 | 15 | 1054 | 1105892 | 2.105894 |
| 10 | 0 | 540 | 1078920 | 1.078921 |
| 9 | 45 | 1027 | 1051946 | 2.051948 |
| 9 | 30 | 513 | 1024974 | 1.024975 |
| 9 | 15 | 1000 | 998000 | 2.998001 |
| 9 | 0 | 486 | 971028 | 0.971029 |
| 8 | 45 | 973 | 944054 | 1.944055 |
| 8 | 30 | 459 | 917082 | 0.917083 |
| 8 | 15 | 946 | 890108 | 1.890110 |
| 8 | 0 | 432 | 863136 | 0.863136 |
| 7 | 45 | 919 | 836162 | 1.836164 |
| 7 | 30 | 405 | 809190 | 0.809191 |
| 7 | 15 | 892 | 782216 | 1.782218 |
| 7 | 0 | 378 | 755244 | 0.755244 |
| 6 | 45 | 865 | 728270 | 1.728272 |
| 6 | 30 | 351 | 701298 | 0.701299 |
| 6 | 15 | 838 | 674324 | 1.674326 |
| 6 | 0 | 324 | 647352 | 0.647352 |
| 5 | 45 | 811 | 620378 | 1.620380 |
| 5 | 30 | 297 | 593406 | 0.593408 |
| 5 | 15 | 784 | 566432 | 1.566433 |
| 5 | 0 | 270 | 539460 | 0.539460 |
| 4 | 45 | 757 | 512486 | 1.512488 |
| 4 | 30 | 243 | 485514 | 0.485514 |
| 4 | 15 | 730 | 458540 | 1.458541 |
| 4 | 0 | 216 | 431568 | 0.431568 |
| 3 | 45 | 703 | 404594 | 1.404595 |
| 3 | 30 | 189 | 377622 | 0.377622 |
| 3 | 15 | 676 | 350648 | 1.350649 |
| 3 | 0 | 162 | 323676 | 0.323676 |
| 2 | 45 | 649 | 296702 | 1.296703 |
| 2 | 30 | 135 | 269730 | 0.269730 |
| 2 | 15 | 622 | 242756 | 1.242757 |
| 2 | 0 | 108 | 215784 | 0.215784 |
| 1 | 45 | 595 | 188810 | 1.188811 |
| 1 | 30 | 81 | 161838 | 0.161838 |
| 1 | 15 | 568 | 134864 | 1.134865 |
| 1 | 0 | 54 | 107892 | 0.107892 |
| 0 | 45 | 541 | 80918 | 1.080919 |
| 0 | 30 | 27 | 53946 | 0.053946 |
| 0 | 15 | 514 | 26972 | 1.026973 |
| 0 | 0 | 0 | 0 | 0.000000 |

*Figure 11*

| Procedures and Methods for formatting the Timestamp. |
|---|
| Day-Number from Seconds since Proleptic UTC1970  Equation 02<br>There are 86400 (or 24 x 60 x 60) seconds in a 24 hour day.<br>Day-Number = FLOOR((Seconds since Epoch - (Leap Seconds-10)) / 86400) |
| Day-Number from MjD plus Seconds  Equation 04<br>The MjD for the day 1970-01-01 is 40587.<br>The Day-Number may be calculated from the MjD as<br>Day-Number = (MjD - 40587) |
| Time of Day from Seconds and Sub-seconds  Equation 08<br>TOD = (Seconds since Epoch - (Leap Seconds - 10)) + Sub-seconds |
| Time of Day from MjD plus Seconds  Equation 10<br>No conversion is required because the time is already in the TOD form.<br>TOD = Seconds + Sub-seconds |
| Time of Day from Media index count  Equation 12<br>TOD = Count-of-media-units x media-rate + Start-of-Day-Offset |

*Figure 14*

Time Label Generation

*Start Parameters*
Application starts process and gives the following:
- Media rate
- Date & Timestamp
- Count mode
- Jam time
-

*Time and Date Data Preparation*
Format Date & Timestamp into:
- Day_Number (Modulo 1001 Days since 1970-01-01)
- TOD_Seconds
- TOD_Sub-seconds

*Day Phase-Number*
From the Day_Number determine:
- Phase-Number
- Alignment_Offset to start of first Frame Block
- Number of Media Frame Counts in a day
- Number of counts to insert into ST12-1 Time Address

*Integer Media Index Count*
From the Time-of-Day:
- Determine the value of the Media Index Count at current time
- Increment count by one to label the Next Media Frame

*SMPTE ST12-1 Time Address*
Conversion to ST12-1 Time Address
- Convert to ST12-1 Time Address per EG40 except
- If last minute of day
    DO NOT omit frame counts 00 and 01.
- If second to last minute of the day and UCC correction is 4 Frames
    DO NOT omit frame counts 00 and 01.

*SMPTE ST309 Date*
Date related to Time Address day for ST309
- Test for day boundary
- Format Date to YYMMDD or MJD

*Output ST12-1 Time and Control Code*

*Figure 15*

Timestamp Recovery

Input ST12-1 Time and Control Code

Time and Date
Extract from the ST12-1 Time Address and Binary Groups
- Time Address
- Date (if encoded in Binary Groups)
- Counting mode Drop Frame / Non Drop frame / UCC Count Mode
- Color framing – Enabled/Disabled

Date
Convert Date information
- Day Number
- If no data is available use system defaults.

Daily Correction
For the day determine magnitude of daily correction
- Using Phase-Number determine number of count corrections

Midnight Alignment
Determine the phase alignment for Media Unit 00:00:00:00

Integer Media Index Count
Convert the Date and Time Address data to Media Time Label
- Hours, minutes, seconds, frames to Media Unit Count
- Undo Daily Correction adjustment

Time of Day
Convert Time Address information
- Convert Media Unit Count to Seconds and Sub-seconds plus midnight offset.

Output Timestamp and Date

*Figure 16*

METHOD AND APPARATUS FOR DETERMINISTIC DATE AND TIME ALIGNMENT OF MEDIA SIGNALS AND GENERATION OF TIME-RELATED LABELS

CROSS-REFERENCE TO RELATED APPLICATIONS

This application claims priority from U.S. provisional patent application No. 62/080,753 filed on Nov. 17, 2014.

BACKGROUND (a) Field

The subject matter disclosed generally relates to media signal labeling. More specifically, it relates to the generation of time-related labels for media signals.

(b) Related Prior Art

Television in North America and some other regions of the world is typically generated with a video frame rate of 30/1.001 frames per second. As a result the number of video frames in a 24 hour period is not an integer value and also the phase alignment of the video frame boundaries to the 24 hour midnight rollover varies from day to day. For television production and broadcast applications, it is desirable and required to have the media frames labeled so that the video and its related audio signals may be controlled accurately and efficiently. Precise timing is critical for synchronization and seamless broadcast presentation. A labeling standard commonly referred to as "SMPTE time code" was developed by the Society of Motion Picture and Television Engineers (SMPTE) to label each video image frame with a time code number. For user utility and convenience, this label includes a time address number in the form of hours (00 to 23), minutes (00 to 59), seconds (00 to 59), and frames (00 to 29). With this labeling applied to video frames at a rate of 30/1.001 Hz, there is a drift of the time code and time address value as compared to a wall clock. To alleviate this drift, there is a modified counting mode referred to as 30 drop frame that modifies the count sequence to compensate for most of this drift (but not the whole drift). When this time code is required to maintain a more precise relationship to clock time, a daily correction is required. This daily correction is commonly referred to as a daily jam. This process of a daily jam is currently non-deterministic and is not standardized (since it can be implemented in various ways which may not be consistent). With the advent of packet switched technologies such as Ethernet and packetized media for television systems, there is a need to develop new techniques for controlling and synchronizing video and audio signals in a television system.

There exists methods and systems that are used to time code media samples. The methods try to associate a true time to media samples whose time codes contain an amount of drift which can arise from having non-integer frame rates. Adjustments with offset parameters are made to adjust the time coordinates.

There is thus a need for a method to determine the label of a media frame using deterministic and reversible calculations. There is a need for a system that would be fully deterministic so that it would be possible to convert from a point in time on one timescale to a corresponding point on another scale and to then convert back to the original time point. For example, a clock time could be converted to a frame label and then independently back to a clock time.

There is further a need to better account for leap seconds and days (on leap years), for changes between daylight saving time and standard time and for global synchronization between media.

SUMMARY

The method described herein below addresses these needs by making use of 1001-related numerical patterns on phase-offsets that will be detailed further below.

If a frame is aligned (zero phase offset) at midnight, then at subsequent midnights the phase offsets will assume one of the 1001 regularly spaced discrete offset values and that on the 1001th day the offset will again be zero (aligned to midnight). (This presumes no interruption of the timescale with 86400 seconds in a day.) Since these numerical patterns are predictable, they can be used to develop a deterministic method to assign a label to a media frame.

To do so, a timestamp is converted to a day number and a time of day. The day number is a zero based count of UTC calendar days from the media alignment epoch (i.e., reference). The timestamp may be expressed in the form of a count of seconds and a sub-seconds count from the IEEE STD 1588 PTP epoch. The PTP epoch is midnight at 1970-01-01T00:00:00TAI. Other epochs are possible. Day number for other days and also the time of day can be calculated using methods known to those skilled in the art. The time of day is a count of seconds and sub-seconds count from midnight. From the day number, the number of media counts in the day is determined, and so is the offset to the first frame block. From the time of day, the media index can be derived deterministically.

The complete method is more completely and thoroughly described further below. Now, for better understanding of the method as described further below, some methods known in the prior art will be discussed.

In 1999, there was developed a method for modifying the SMPTE ST 12-1 (it was then known as SMPTE 12M) Time and Control Code standard to correct for the residual drift of the 30 drop frame Time Address related to 30/1.001 Hz video. [Brooks Harris, Proposed SMPTE Standard S22. TCOx1-1999 Nov. 18, 1999]

This Date Compensated Count (DCC) process recognized the 1001-day cycle and used a fixed algorithm to evenly distribute the daily corrections over the 1001-day period. The methods and procedures described herein expand and improve on this process by providing deterministic corrections that reflect the actual daily phase alignment variations and also include corrections to compensate for other alignment shifts caused by leap second insertions, and shifts to and from standard time and daylight saving time. In addition there is compensation for the initial phase alignment at a defined Media Epoch. The end result is a process that provides a deterministic relationship between clock time and a time related media index label. Furthermore, the time related media index labels may be accurately converted back into precise clock timestamp values. In addition to the 30/1.001 Hz related media rate the process can also be used for other 1001-related rates such as 24/1.001 and 25/1.001 and further to integer multiples of these rates. Media at integer rates such as 24 Hz and 25 Hz do not require the use of many of the methods described below; however a similar process may be applicable at these rates.

With the development of standards to use Internet Protocol packet switched networks for media workflows, there is a need to be able to establish and maintain the SMPTE ST 12-1 Time and Control Code synchronized to clock time over a distributed system. Prior methods used a wired distribution of reference signals from a centralized point. There is the intention in these new system installations to use clock time which is globally available from sources such as GPS or GLOSNAS. These time references may be communicated over an Ethernet network using the IEEE STD 1588 Precision Time Protocol (PTP) or Network Time protocol (NTP). There are alternate means that may be employed for the accurate distribution of clock time.

The method starts by selecting or proposing a Media Epoch (time reference). All signals should be generated to have a defined alignment relative to that Media Epoch. One of these signals is the SMPTE ST 12-1 Time and Control Code.

Local clock timescales are nominally continuous, but periodically, corrections may occur such as leap second corrections and standard time/daylight saving time shifts which may interrupt the regular clock progression. Since the timing and instantiation of these corrections are not standardized, a UCC timescale is presented here as a normalized basis for the calculations. The results based on this timescale may be easily translated according to the local rules to the local timescale.

Existing methods for 30/1.001 Hz video compensate for the daily Time Address variations and maintain a semblance of correlation with clock time by a process of a "Daily Jam" of the Time Address to a time clock being performed at a designated clock time. The process requires specific information such as the times of the previous and next "Daily Jam" in order to produce a consistent result. However, without knowledge of this specific information, the results are not deterministic and different results will be produced depending on the clock time when the "Daily Jam" is performed. Also the reverse process of converting back to a timestamp requires information, such as the magnitude of the correction that was made at the "Daily Jam" time, which is not preserved. The methods and procedures outlined below do not require any special information other than the date and time and are totally deterministic. In addition, the computational processes require much fewer computational resources and less calculation precision.

The media signals are generated so that they are phase aligned as if they were aligned at the Media Epoch. Embodiments of a method are provided to determine the specified media frame phase alignment at any point in time.

There is described below a method based on the behavior of video systems with an operating rate of 30/1.001, which is prevalent in North America. Methods and algorithms were discovered that describe the behavior of these systems and that have a deterministic cycle, which repeats on 1001 intervals of seconds, minutes, hours and days. An apparatus and a method were developed therefrom to control, monitor and document these relationships to time. Extensions are made to systems operating at other 1001-related rates.

One of the advantages of the method described herein is a deterministic labeling of fractional frame rate video media that is commonly deployed in North America at a frame rate of 30/1.001 Hz. The predominant fractional rate in use is 30/1.001 Hz, but similar procedures apply to other fractional rates and may also be applicable to integer rates.

Labels of media at a fractional rate of 30/1.001 Hz progress with a timeline that has a linear drift from an integer second based timeline. From a simulation and analysis of the phase alignments of the video frames against time, there was found a method that describes the sequence of phases (Phase-Numbers) that repeat over 1001 time intervals of seconds, minutes, hours and days. There were thus found algorithm adjustments that can be used to compensate for clock timescale shifts such as leap second adjustments, for standard time/daylight saving time shifts and for changes of time zones. The result is a family of steps that deterministically define the media phase alignment for the start of the calendar day, for any second during the day and for time zones offset from UTC.

Before the media is labeled, it must be generated in a manner that respects the relevant standards that define the alignment of media signals with respect to time. The method described herein provides a means of using the Phase-Numbers to generate the media signals aligned according to these standards.

For time zone offsets from UTC the application of leap seconds to clock time is not definitively defined by any standard. This mitigates against a deterministic media labeling that is independent of the time zone.

Labeling of media typically uses SMPTE standard ST 12-1 time code, however this standard does not perfectly accommodate for the non-integer number of video frames in a 24 hour day. The method described herein makes a deterministic correction to the time address count defined by ST 12-1 that fully and deterministically corrects for the deviations.

Since the determination of media labels is deterministic it is possible to convert a media label to a timestamp. This is important when calculating the duration of media segments and for determining the offsets among different media such as audio and video.

The end result is a deterministic labeling of media that also can be reconverted back into precision timestamp values.

Media Formats and Rates

When whole non-prime numbers are divided by a prime number the fractional portion of the result is a string of digits that does not end. These digits consist of a pattern of digits that repeat (repeating decimals). These fractional values are sometimes represented herein with the repeating digits shown in parenthesis but generally in tables as values truncated after 6 digits. For example, the NTSC frame rate labeled as 30/1.001, is, more correctly, 29.97002997002997 . . . . It is herein presented as 29.(970029) or 29.970029, where the 6 decimal digits is a series of decimal digits that repeat. The value 1001 is the multiplication of three prime numbers ($1001=7\times11\times13$). It is a mathematical characteristic of integers divided by 1001 that the result will have a fractional value with a sequence of 6 repeating digits. It explains why this number is used to divide the nominal media rates.

NTSC video operates at a frame rate of 30/1.001 Hz. At this frequency the duration of a video frame is 0.0333(6) seconds. In a 24 hour day there are 2589410.(589410) video frames. Also in a 24 hour SMPTE ST 12-1 Time Address period there are 2589408 Time Address frame counts. Thus there is a difference of approximately 2.598410 frames. Since the video rate may not be altered, skewed or interrupted, keeping the Time Address aligned with wall clock time requires that the corrections be made in increments of whole frame counts. Furthermore, there is a requirement that color frame identification be maintained by the Time and Control Code, and the corrections must be made in two frame increments.

The description is focused on media at 30/1.001 Hz-related rates, but the process is also applicable at media rates such as 24/1.001 Hz, 25/1.001 Hz and their integer multiples.

Definitions

1) Media Alignment Origins

The logistics for the selection of a Media Epoch depends on the objectives of the application.

Media Epoch, a.k.a. time reference: The Media Epoch could be 1972-01-01T00:00:00Z (UTC). This is the point in time for which international standards and agreements define the relationship between the TAI and UTC timescales. At this time, the relationship between the two timescales is defined by the equation "UTC−TAI=−10 s". The IEEE Std 1588 PTP Epoch point in time is 63,072,010 seconds before 1972-01-01T00:00:00Z.

Calendar Day Origin: Applications that may not require a global scope can select to use an alternate origin that is midnight of the local calendar day (or another defined time of day). As a result the media will be aligned with zero video phase offset at midnight. The rationale is that the phase alignments are the same for any 24 hour period.

Undefined Origin: Where the alignment origin is undefined and uncontrolled, the method described herein is likely to offer as much benefit as for the cases mentioned above.

Time Distribution: There are numerous methods for the global and regional distribution of clock time references. The ITU Recommendation ITU-R TF.460-6 specifies the use of Coordinated Universal Time (UTC) as the timescale for the distribution of clock time. For the purposes of this document, the date and time are converted to a count of days since the Day-Zero media time reference origin and the Time-of-Day (TOD) expressed in seconds and sub-seconds.

Global Navigation Satellite Systems (GNSS): National satellite time distribution systems are very commonly used for the distribution and determination of precision clock time. The format of time and date from GPS or GLONASS receivers may vary and is typically provided as a UTC time-of-day (TOD) and date data along with a timing mark signal. The Modified Julian Date (MJD) for the GPS system epoch 1980-01-06 is 44244.

IEEE Standard 1588 Precision Time Protocol (PTP): If the source of time and date is via IEEE Std. 1588 Precision Time Protocol (PTP) the time is provided by the "Timestamp.secondsField" and the "Timestamp.nanosecondsField". The Local Time is calculated from these values with the use of the "AlternateTime TLV" data (or other system message) and other data communicated by the PTP. The PTP timestamp is a count of seconds from the PTP Epoch, which is 1970-01-01T00:00:00 on the TAI timescale.

Network Time Protocol (NTP): NTP provides Coordinated Universal Time (UTC) including scheduled leap second adjustments. No information about time zones or standard/daylight saving time is transmitted; this information is outside its scope and must be obtained separately. The 64-bit timestamps used by NTP consist of a 32-bit part for seconds and a 32-bit part for fractional second, giving NTP a timescale that rolls over every $2^{32}$ seconds (136 years) and a theoretical resolution of $2^{-32}$ seconds (233 picoseconds). NTP uses an epoch of Jan. 1, 1900. The first rollover occurs in 2036. The MJD for 1900-01-01, the NTP Prime Epoch, is 15020.

Radio: UTC time is broadcast by several national ratio services such as WWV (US), CHU (Canada), NPL Time & Frequency Services (UK), DCF77 (Germany).

Media Unit, a.k.a. media frame: Discrete unit of a media, such as a video frame, a unit of a soundtrack, or a unit of another media format.

Media frame block: Group of consecutive media units, often comprising two media units.

2) Mathematical Functions and Operations

MODULUS function: The modulus operator or function may return different results, in particular for negative arguments, when implemented on different computing platforms. For the purpose of this document the modulus function expressed as "MOD(A,B)" or "A % B" returns the remainder after the division of the numerator "A" by the denominator "B". For example with arguments: A=5, 4, 3, 2, 1, 0, −1, −2, −3, −4, −5 and B=3; the function A % B returns the values: 2, 1, 0, 2, 1, 0, 2, 1, 0, 2, 1. This is consistent with the results produced by the MOD(A,B) function in Microsoft Excel.

FLOOR function: The floor function returns the largest integer value that is less than the argument. For example with arguments: A=1.5, 1.0, 0.5, 0, −0.5, −1.0, −1.5; the function FLOOR(A) returns the values: 1, 1, 0, 0, −1, −1, −2. This is consistent with the results produced by the FLOOR (A,SIGN(A)) function in Microsoft Excel.

CEILING function: The ceiling function returns the smallest integer value that is greater than the argument. For example with arguments: A=1.5, 1.0, 0.5, 0, −0.5, −1.0, −1.5; the function CEILING(A) returns the values: 2, 1, 1, 0, −0, −1, −1. This is consistent with the results produced by the CEILING(A,SIGN(A)) function in Microsoft Excel.

Therefore, a deterministic method of labeling the video and other media frames based on a clock time reference is presented herein. This solution must also take into consideration disturbances in the time clock systems such as the insertion of leap seconds and standard/daylight saving time shifts. Separately but related to this standards bodies are in the process of creating standards which establish a Media Epoch at which media signals can have a defined alignment to time and to each other.

There are described below embodiments of an apparatus and of a method, which may be applied to deterministically and precisely label media frames with a date and time related label and that this label may be deterministically converted back into date and clock time values. These embodiments are primarily defined for currently standardized media rates, which are related to fractional media rates defined by an integer number divided by 1.001. These embodiments are also extensible to the labeling of integer media rates which may not have the problem of a daily drift but are still affected by the timescale interruptions. To assist in generating correctly aligned media frames, embodiments are defined to govern the intended phase alignment of the media frames at a specified point in time. Another advantage of this method is to generate media signals and their parts in a deterministic manner as if they had been aligned at the Media Epoch and continuously generated since then. To completely eliminate the drift in the SMPTE ST 12-1 time address labels, the method makes a small correction to the time address count algorithm.

According to an aspect of the invention, there is provided a computer-implemented method for generating a frame label for a media frame sampled at a media frame rate at a given time-of-day relative to a day-zero reference, the method comprising:

obtaining a calendar day at which the media frame is sampled, the calendar day having a day origin;

computing a day-origin phase offset at the day origin based on the day-zero reference and on the calendar day;

subtracting the day-origin phase offset from the given time-of-day to get a media frame relative offset which is relative to a first frame of the calendar day;

computing the frame label from the media frame relative offset and from the media frame rate; and assigning the frame label to the media frame for time-positioning the media frame with respect to other media frames and with respect to a timescale.

According to an embodiment, determining the frame label comprises numbering media frames on the calendar day from zero up to a total number of frame counts per calendar day.

According to an embodiment, the media frame is sampled at one of the following media frame rates or an integer multiple thereof:
  30 Hz divided by 1.001;
  25 Hz divided by 1.001; and
  24 Hz divided by 1.001.

According to an embodiment, the media frame is sampled at a media frame rate of 30 Hz divided by 1.001, the method further comprising calculating a total number of frame counts per calendar day, the total number of frame counts comprising 2,589,408 frame counts plus a correction.

According to an embodiment, determining a day-origin phase offset comprises:
  determining a number of days between the calendar day and the day-zero reference;
  multiplying the number of days by a day-index to phase-number conversion factor; and
  calculating a remainder of a division by 1001.

According to an embodiment, multiplying the number of days by a day-index to phase-number conversion factor comprises multiplying the number of days by:
  411 if the media frame rate is 30 Hz divided by 1.001 and the media frame is in a one-frame block;
  706 if the media frame rate is 30 Hz divided by 1.001 and the media frame is in a two-frame block;
  843 if the media frame rate is 25 Hz divided by 1.001 and the media frame is in a one-frame block;
  461 if the media frame rate is 25 Hz divided by 1.001 and the media frame is in a four-frame block;
  529 if the media frame rate is 24 Hz divided by 1.001 and the media frame is in a one-frame block; and
  706 if the media frame rate is 24 Hz divided by 1.001 and the media frame is in a two-frame block.

According to an embodiment, there is further provided determining whether the calendar day is a long day or a short day.

According to an embodiment, determining whether the calendar day is a long day or a short day comprises determining whether the day-origin phase offset is smaller than a long-day phase-number threshold or not smaller than the long-day phase-number threshold, respectively, wherein the long-day phase-number threshold is:
  590 if the media frame rate is 30 Hz divided by 1.001 and the media frame is in a one-frame block;
  295 if the media frame rate is 30 Hz divided by 1.001 and the media frame is in a two-frame block;
  157 if the media frame rate is 25 Hz divided by 1.001 and the media frame is in a one-frame block;
  540 if the media frame rate is 25 Hz divided by 1.001 and the media frame is in a four-frame block;
  529 if the media frame rate is 24 Hz divided by 1.001 and the media frame is in a one-frame block; and
  236 if the media frame rate is 24 Hz divided by 1.001 and the media frame is in a two-frame block.

According to an embodiment, there is further provided determining if the calendar day is a leap-second insert day, wherein determining whether the calendar day is a long day or a short day comprises:
  if the calendar day is not a leap-second insert day, determining whether the day-origin phase offset is smaller than a long-day phase-number threshold or not smaller than the long-day phase-number threshold or not smaller than the long-day phase-number threshold or not smaller than the long-day phase-number threshold, respectively; or
  if the calendar day is a leap-second insert day, determining whether the day-origin phase offset is smaller than a leap-second-insert phase-number threshold or not smaller than the leap-second-insert phase-number threshold, respectively,
wherein the long-day phase-number threshold is:
  590 if the media frame rate is 30 Hz divided by 1.001 and the media frame is in a one-frame block;
  295 if the media frame rate is 30 Hz divided by 1.001 and the media frame is in a two-frame block;
  157 if the media frame rate is 25 Hz divided by 1.001 and the media frame is in a one-frame block;
  540 if the media frame rate is 25 Hz divided by 1.001 and the media frame is in a four-frame block;
  529 if the media frame rate is 24 Hz divided by 1.001 and the media frame is in a one-frame block; and
  236 if the media frame rate is 24 Hz divided by 1.001 and the media frame is in a two-frame block, and
wherein the leap-second-insert phase-number threshold is:
  560 if the media frame rate is 30 Hz divided by 1.001 and the media frame is in a one-frame block;
  280 if the media frame rate is 30 Hz divided by 1.001 and the media frame is in a two-frame block;
  133 if the media frame rate is 25 Hz divided by 1.001 and the media frame is in a one-frame block;
  754 if the media frame rate is 25 Hz divided by 1.001 and the media frame is in a four-frame block;
  448 if the media frame rate is 24 Hz divided by 1.001 and the media frame is in a one-frame block; and
  224 if the media frame rate is 24 Hz divided by 1.001 and the media frame is in a two-frame block.

According to an embodiment, the media frame is sampled at 30 Hz divided by 1.001 and the media frame is in a two-frame block, wherein calculating a total number of frame counts per calendar day comprises adding a correction equal to:
  +2 if the calendar day is a short day and not a leap-second insert day;
  +4 if the calendar day is a long day and not a leap-second insert day;
  +32 if the calendar day is a short day and a leap-second insert day; and
  +34 if the calendar day is a long day and a leap-second insert day.

According to an embodiment, determining the frame label of the media frame comprises: determining a number of seconds between the day origin phase offset and the given time-of-day; and dividing the number of seconds by the media frame rate to produce a media label count value.

According to an embodiment, a clock time source for the given time-of-day is one of: IEEE 1588 Precision Time Protocol (PTP); NTP; GPS; and SMPTE ST 12-1 Time Code with a date formatted per SMPTE ST 309.

According to an embodiment, media are defined as being aligned at a media epoch reference, the media epoch reference being the SMPTE Epoch of 1970-01-01T00:00:00 on a TAI timescale.

According to an embodiment, the day-zero reference is 1972-01-01 on a UTC timescale.

According to an embodiment, computing a day-origin phase offset comprises determining a local clock time shift resulting from the onset or retreat of daylight saving time which results in a shift of a local time offset which matches the one-hour daylight saving time shift.

According to an embodiment, computing a day-origin phase offset comprises determining a change in a length of the calendar day resulting from a leap second adjustment which results in a corresponding change in a number of media frame counts representing one second at the media frame rate.

According to an embodiment, a media frame sampled at an integer multiple of a media base frame rate has a day count origin which starts at the day-origin phase offset for a media frame at the media base frame rate.

According to an embodiment, determining the day-origin phase offset is based on a time zone offset from UTC.

According to another aspect of the invention, there is provided an apparatus for generating a frame label for a media frame sampled at a media frame rate at a given time-of-day relative to a day-zero reference, the apparatus comprising:
  a clock source for obtaining the given time-of-day and a calendar day at which the media frame is sampled, the calendar day having a day origin;
  a PLL oscillator for determining a day-origin phase offset at the day origin based on the day-zero and on the calendar day, and for determining a media frame relative offset which is relative to a first frame of the calendar day;
  a computing device, operably connected to the clock source and to the PLL oscillator, for computing the frame label from the media frame relative offset and from the media frame rate; and
  a memory, operably connected to the computing device, for storing the frame label assigned to the media frame prior to outputting the media frame from a computer.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1 is a table illustrating alignment phase for 1001 cycles of seconds, minutes and hours for 30/1.001 Hz frame pairs, according to an embodiment;

FIG. 2 is a table illustrating alignment phase for 1001 cycles of seconds for 30/1.001 Hz frame pairs, according to an embodiment;

FIG. 3 is a table illustrating alignment phase for 1001 cycles of days for 30/1.001 Hz frame pairs, according to an embodiment;

FIG. 4 is a table illustrating formulae for 30/1.001 Hz media block alignment phases, according to an embodiment;

FIG. 6 is a table illustrating constants and parameters for various fractional frame rates, according to an embodiment;

FIG. 7 is a table illustrating leap seconds for 30/1.001 Hz two-frame block media with PTP phase alignment, according to an embodiment;

FIG. 8 is a table illustrating leap seconds for 30/1.001 Hz two-frame block media with 1972 phase alignment, according to an embodiment;

FIG. 11 is a table illustrating time zone phase alignment offsets, according to an embodiment;

FIG. 14 is a table illustrating a method for formatting and calculating timestamp values, according to an embodiment;

FIG. 15 is a flowchart illustrating a method for generating UTC-related media labels, according to an embodiment; and FIG. 16 is a flowchart illustrating a method for recovering date and timestamps from ST 12-1 time and control code, according to an embodiment.

It will be noted that throughout the appended drawings, like features are identified by like reference numerals.

DETAILED DESCRIPTION

Figure 5:
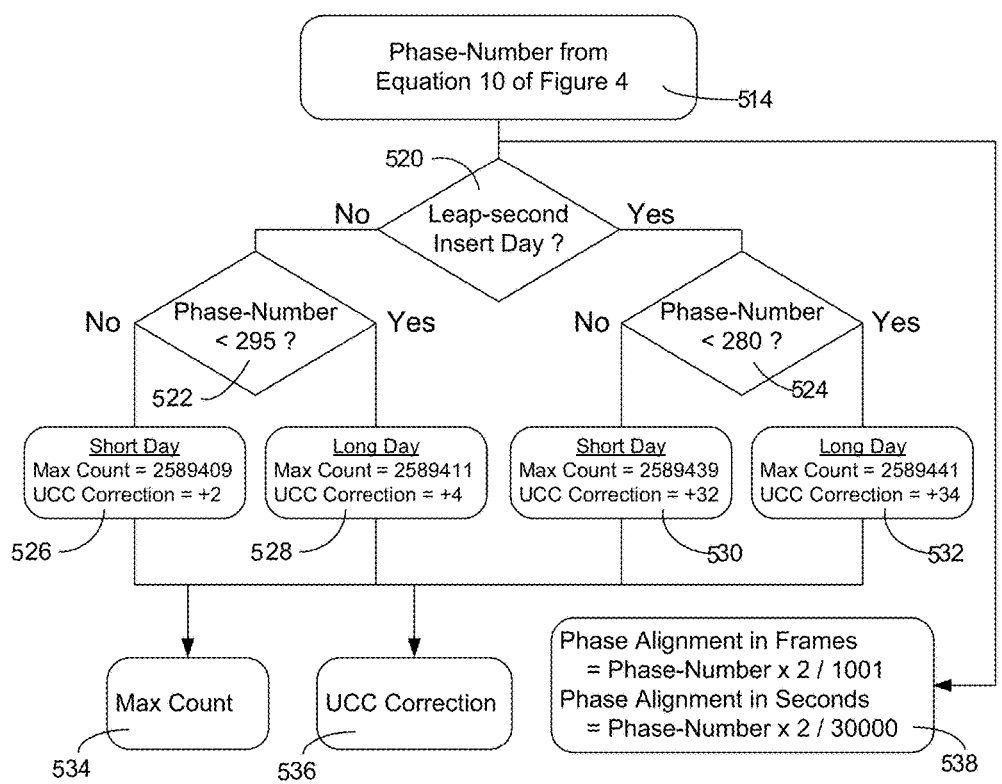
FIG. 5 is a flow chart illustrating a method to generate a time related label parameter limits, according to an embodiment.

In embodiments there are disclosed several aspects of media signal generation, labeling and the relationship to clock time. The basics of the relationship between media signals and a timescale govern the generation of the media signals and the labeling of the media units. The UCC timescale described herein is directly related to the standard TAI and UTC timescales with refinements to unify the treatment of discontinuities such as leap second corrections. Media labeling is based on the principle of a date and a zero-based count of media units beginning at midnight and progressing linearly through the day. Conversion of the media label to character formats provides compatibility with industry standard label formats such as the time address defined in SMPTE standard ST 12-1. There is described a method to relate a media label back to a timestamp. Embodiments of an apparatus and a method assist in the deterministic alignment of media frames or units to a reference time origin, a.k.a. media epoch or media epoch reference.

Foundation for the Disclosure and Development of the Algorithms

For media at the 1001-related fractional rates, the rate is one tenth of one percent slower than for the related integer rate because it is divided by 1.001. This results in an alignment phase drift when observed at regular one-second intervals. Traditional mathematical methods used to calculate and tabulate the phase alignment of media signals against time require significant precision and computational resources. There is herein defined the 1001 discrete alignment phases that the media frame blocks will assume. These phase alignment values are arranged in ascending order and are assigned Phase-Numbers, from zero to 1000.

1001 Cycles of Seconds, Minutes, Hours, and Days

For media at rates such as 30/1.001 Hz, the media frame block alignment relative to the time base will repeat in cycles of 1001 time periods with a defined a sequence of phase alignments. These phase alignments can be represented by sequences of Phase-Numbers. In practice, time periods of seconds, minutes and hours are generally on uninterrupted timescales. However, the occurrence of days on the timescale is subject to shifts due to Leap Second corrections. For this reason the process for the day phase sequence is subject to discontinuities.

Phase-Numbers for Seconds, Minutes and Hours

Figure 1:
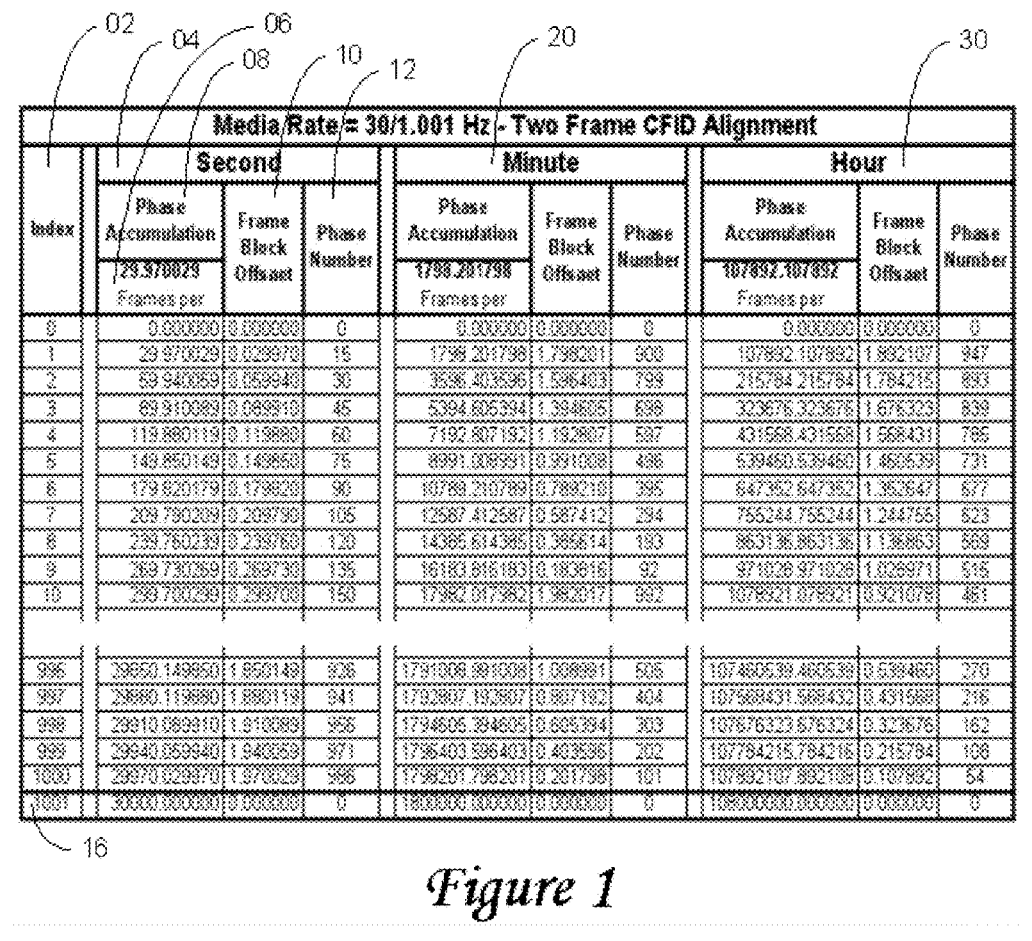

Now referring to FIG. 1, a table illustrates alignment phases for 1001 cycles of seconds, minutes and hours for 30/1.001 Hz frame pairs, according to an embodiment. For a media rate of 30/1.001 Hz with a two-frame color frame identification (CFID) block, tables of phase accumulation, frame block offset and phase-number are tabulated for increments of seconds, minutes and hours. For brevity the middle of the table is redacted.

The table in FIG. 1 shows phase alignment time values related to cycles of seconds, minutes and hours, with an index (02) numbered from zero to 1000. An entry of index 1001 links to the start of the next 1001 step cycle. Since the table has a regular progression for each cycle the middle of the table is redacted for brevity. For the seconds (04) portion of the table the Phase Accumulation (08) has an initial value of zero indicating a defined initial alignment of a zero phase offset. The media is incrementing at a rate of 30/1.001 Hz or approximately 29.(970029) frames per second, and thus the elapsed time in frames to the beginning of each subsequent second are calculated. With the passage of each second the numbers of frames (06) that pass by each second are added to the Phase Accumulation. The frames are treated in blocks of pairs so the Frame Block Offset (10) is the remainder resulting from a modulo-two division of the Phase Accumulation value.

Now referring to FIG. 2, a table illustrates alignment phase for 1001 cycles of seconds for 30/1.001 Hz frame pairs, according to an embodiment. For a media rate of 30.1.001 Hz with a two frame color frame identification (CFID) block seconds, a table of phase accumulation, frame block offset and phase-number are sorted in order of ascending frame block offset. This sorted table is used to assign the phase-numbers from zero to 1000.

The list sorted by ascending value of Frame Block Offset is shown in FIG. 2. From this table, the magnitude of each phase increment is determined to be a constant 0.001998 frames. The Phase-Number (12) is set to ascending values from zero to one thousand (1000). The list is resorted in order of ascending Index number (02) as shown in FIG. 1. In FIG. 1 the Phase-Number (12) column is filled with values from 0 to 1000. The Phase Offset shift is constant from one entry to the next, and thus the Equation 16 and the Equation 18 relate the Phase offset to the Phase-Number as is shown in FIG. 4. Examining the progression of the Phase-Number values from Index to Index reveals the Equation 02 relating the Phase-Number to the Index and thus the relationship of the Frame Block Offset to the Index as is detailed in FIG. 4.

In FIG. 1 and FIG. 2, the Index 1001 (16) illustrates that the alignment offset that begins at zero returns to zero on the cycle after the 1001th cycle (Index 1000) and thus, if undisturbed, will thereafter repeat again every 1001 cycles.

This process that is described above is repeated for the Minutes (20) section of the table and also for the Hours (30) section of the table with the resulting equations as is detailed in FIG. 4.

Phase-Number for Days

Referring to FIG. 3, a table illustrates alignment phase for 1001 cycles of days (40) for 30/1.001 Hz frame pairs, according to an embodiment. For a media rate of 30.1.001 Hz with a two frame color frame identification (CFID) block tables of phase accumulation (48), frame block offset (50), offset at 24 h (54), daily count correction (56) and phase-number (52) are tabulated for increments of daily increments. Referring to FIG. 4, a table illustrates formulae for 30/1.001 Hz media block alignment phases, according to an embodiment. These are equations relating to the calculation and application of phase-numbers.

The steps described above are repeated for the Day table in FIG. 3 with the resulting equations as is detailed in FIG. 4. Since the Day table has a regular progression for each cycle the middle of the table is redacted for brevity.

Presuming a 30/1.001 Hz video signal aligned at midnight, the start of the first day (Day-Zero) and with a "Daily Jam" correction at the beginning of each day to keep the drift less than two frames (at this rate there are 2 frames in the color frame block), the alignment errors at the beginning of each day are shown in the Table in FIG. 3. This Table also indicates the number of frame count corrections that are necessary at the end of each day. Examination of this table illustrates that the alignment error returns to zero on the day after the 1001th day and thus every 1001 days thereafter. Also the alignment errors at the beginning of each day do not have an obvious pattern however there is evidence of a pattern, although not entirely regular, to the daily count corrections. The disclosure of the methods for defining the pattern and the pattern itself are part of the disclosure described below.

Based on a 30/1.001 Hz video signal and using the "30 drop frame" counting method defined in SMPTE Standard ST 12-1, there are 2589408 Time Address counts in a 24 hour time code day. Thus, with the video signal initially aligned at midnight (the start) of the first day (Day-Zero) and making Daily_Count_Corrections (56) at the day transitions to keep the daily drift offset less than two frames (at this media rate there are two frames in the color frame block), the Daily Alignment Corrections (48) at the day transitions are shown in the table of Alignment Phases in FIG. 3.

The Daily Count Corrections show evidence of order but not an obviously regular pattern. Sorting the table in order of ascending Phase-Numbers shows that the Daily Count Correction (526) is plus four frames (Long-days) for Phase-Numbers below 295, and the Daily Count Correction (528) is plus two frames (Short-days) for other Phase-Numbers. A short or long day determination (522) should thus be performed prior to and the Daily Count Correction (526, 528). A leap second insertion determination (520) can also be performed. Further analysis for days when there is a positive leap second insertion indicates that for these days the Daily Count Correction (532) is plus 34 frames (Long-days) for Phase-Numbers below 280 and the Daily Count Correction (530) is plus 32 frames (Short-days) for other Phase-Numbers. Again, a short or long day determination (524) should thus be performed prior to and the Daily Count Correction (530, 532). For days when there is a negative leap second correction (which is an uncommon situation), the Daily Count Correction is minus 26 frames (Long-days) for Phase-Numbers below 310 and is minus 28 frames (Short-days) for other Phase-Numbers (not shown).

Leap Second Corrections

When the clock time base is interrupted in increments of integer seconds as will result from leap second corrections, a plus or a minus one second shift, the alignment phase is shifted and the sequence of Short-days and Long-days can also change.

Calculating the alignment shifts that these interruptions create demonstrates a deterministic relationship between the shift and a corresponding shift of the Phase-Number. The result is that in the Equation 10 in FIG. 4, the alignment error at midnight is expressed as a formula that is in terms of the Day-Number and the accumulated leap seconds.

Applying the Phase-Numbers for the Second, Minute and Hour cycles in Equation 14 of FIG. 4 extends the calculation of the phase alignment to any second of the day. The process and the equations for the determination (514) of the number of media index counts in a day are shown in FIG. 5.

Referring to FIG. 5, a flow chart illustrates a method to generate a time related label parameter limits, according to an embodiment. The apparatus is for determining short-days or long-days as a function of the UTC midnight phase-number.

Figure 6:
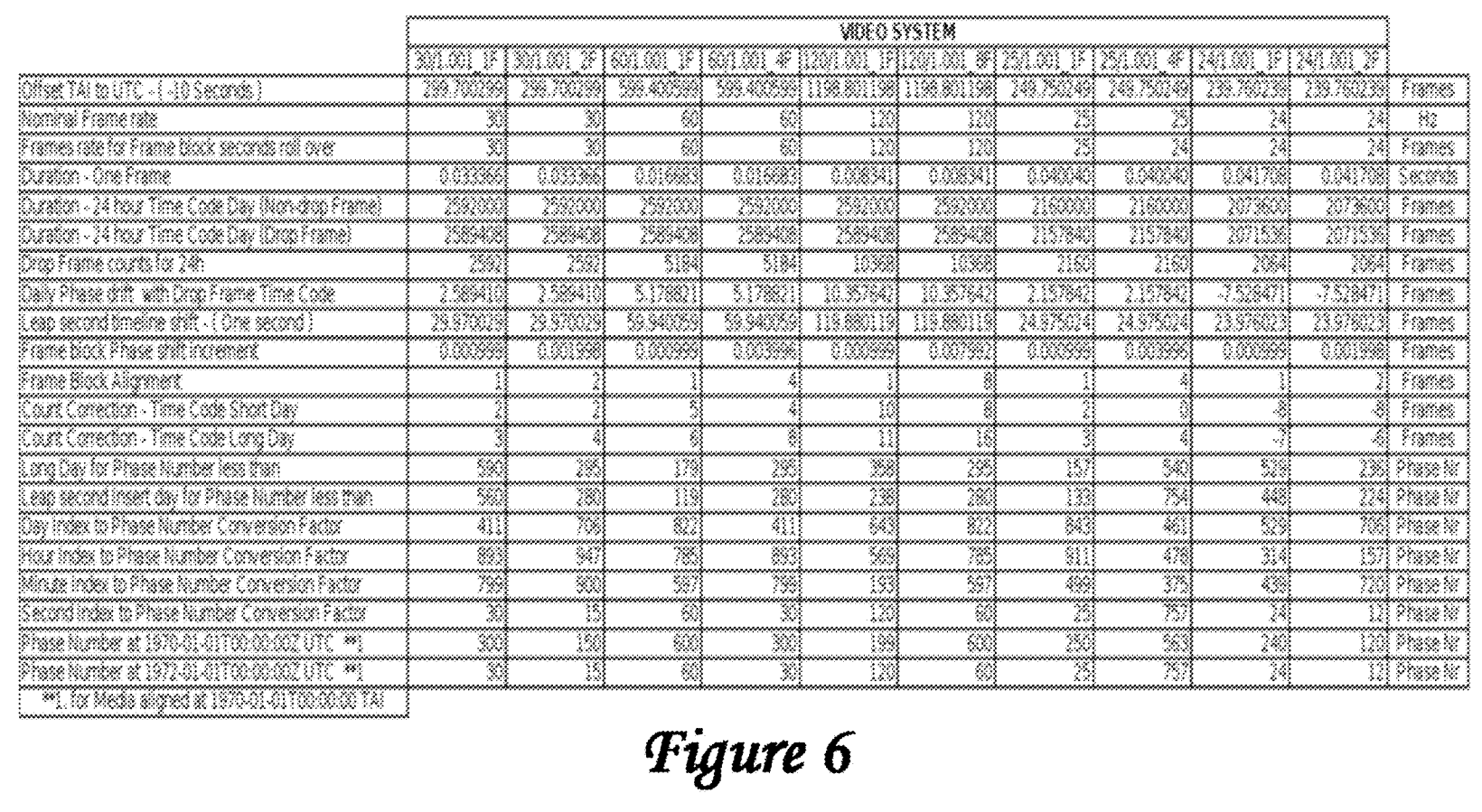

Now referring to FIG. 6, a table illustrates constants and parameters for various fractional frame rates, according to an embodiment. The application examples are typically detailed for media at a rate of 30/1.001 Hz. This table tabulated various parameters for other rates.

The table in FIG. 6 summarizes the constants and rate parameters for the 30/1.001 Hz rate described above and also the values for other rates and frame block sizes. Also, variations of the process may be applied to the simpler case of integer frame rates.

For video rates that are multiples (for example ×2, ×4, etc.), this process may be repeated for these rates although for operational reasons it is desirable to define a relationship where the video at these rates maintains a block alignment between the lower and higher frame rates.

Labeling of Media Frames

Media Labels are formatted in two parts consisting of a date or day count and a frame count beginning at midnight.

This process supports a Media Epoch (an epoch) that can be different from the Day-Zero point in time, and can be the IEEE1588 PTP or POSIX, or other suitable standards.

The IEEE1588 PTP epoch is defined as 1970-01-01T00:00:00 on the TAI timescale.

The POSIX time representation implies a point in time of 1970-01-01T00:00:00Z on a proleptic UTC timescale. This point in time is two years (730 days of 86400 seconds, or 63,072,000 seconds in total) before 1972-01-01T00:00:00Z on the UTC timescale.

If the media was aligned at the IEEE 1588 PTP epoch then this point in time is 10 seconds before midnight at the start of 1970-01-01 on a proleptic UTC timescale. However if the Day-Zero reference day is 1972-01-01 then the PTP epoch is 63,072,010 seconds before this Day-Zero point in time. The Origin Offset is the media phase alignment at the Day-Zero point in time is calculated using the Phase-Number calculation shown in Equation 02 of FIG. 4. For 30/1.001 Hz media the Origin Offset with an offset of 10 seconds is thus 150 for Day-Zero at 1970-01-01 and 15 for Day-Zero at 1972-01-01 (offset 63,072,010 seconds).

The process described in FIG. 5 is based on the Phase-Number calculated at midnight on the UTCZ timescale and is used to determine the media index count range for the calendar day. The media index counts from zero beginning with the first frame block that starts at or just after midnight and counts monotonically up to the Max_Count limit (534). This process also determines the UCC Correction (536) value that is the number of frame counts that must be added to a SMPTE ST 12-1 time address count to maintain a similar count alignment for each calendar day. This count range is applied for all time zone offsets of that calendar day and thus it is independent of the time zone.

The Frame Block Phase Alignment (538) may be calculated using Equations 16 and 18 in FIG. 4 to determine the Frame Block alignment at the beginning of the day.

The UTC Calendar and Local Timescales

A local timescale applied to any time zone facilitates a uniform and deterministic time count, which can be used with any time zone. Leap second corrections are made to the UTC timescale just before midnight on the last day of a month as determined by the International Earth Rotation and Reference System Service (IERS). The ITU recommendation ITU-R TF.460-6 specifies that the leap second correction shall be effected at the last second before midnight of the last day of the designated month. There is no definitive recommendation as to when the leap second correction should be effected in other time zones.

Midnight Alignment of Media Count Frame Zero

Within a time label day the UCC time related label may be expressed with the frame count either as a zero-based integer count of frames or in the Time-of-Day (TOD) form of hours, minutes, seconds and frames (HH:MM:SS;FF). The media phase alignment at UTC midnight of the calendar day may be calculated using the formulae of Equation 10 shown in FIG. 4.

Shifting the UTC timescale into the different time zones results in the phase relative to the different midnights being shifted forward (positive shift) or backwards (negative shift). The application of time zone offsets is a linear time shift of the timescale and thus it is not bounded to this value range and can be either positive or negative. The Phase offset at midnight in any time zone is the sum of the linear and the cyclic components as shown in FIG. 4, Equation 12. For video at a 30/1.001 Hz frame rate and with two frame color frame blocks determining the phase alignment for any integer second point in time is shown in FIG. 4, Equation 14.

Figure 10:
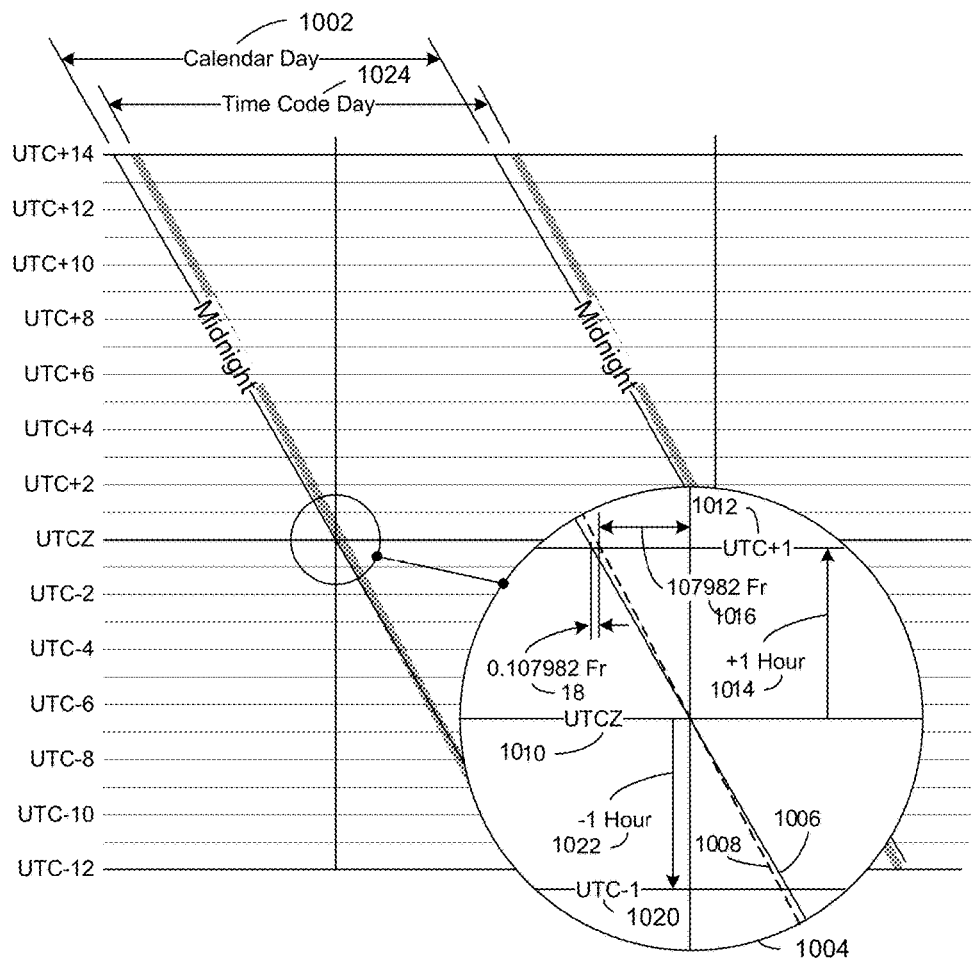
FIG. 10 is a diagram illustrating time zone offsets, according to an embodiment.

Referring to FIG. 10, a diagram illustrates time zone offsets, according to an embodiment for each minute (1006). A pictorial view of a calendar day (1002) and its progression across time zones from UTC+14 hours to UTC−12 hours are shown, with details on the enlarged portion (1004) of the graph for the region around midnight of UTCZ.

Referring to FIG. 11, a table illustrates time zone phase alignment offsets, according to an embodiment. The hour, half and quarter hour time zones are tabulated showing the phase and time offset shifts that are created at midnights of each time zone.

At any point in time observed in any time zone the media-frame-block-to-second phase alignment is the same for all time zones. In all time zones for the same calendar day the media count range will be the same; however, the phase alignment at midnight will vary for each time zone. Time zones are typically denoted as an offset from UTC (1012, 1020) in increments of one-hour, half-hour or quarter-hour increments. At a media frame rate of 30/1.001 Hz, the offset between time zones is 107,892 frames per hour. As shown in FIG. 10, the offset to midnight shifts at a rate of 107,892 integer frames (1016) plus a fractional 0.107892 frames (1018) for each integer time zone (1014, 1022) shift. Thus, the phase alignment shifts by 0.107892 frames (1018) for each hour.

The phase alignment shift expressed in Phase-Number (1008, 1108) units is shown in the graph of FIG. 10 and in the table of FIG. 11 for each hour (1102) and minute (1106), and the corresponding frame offset (1110), including the integer frame offset (1112) and fractional frame offset (1114). This phase adjustment is added to the phase alignment at midnight of UTC. It is noted that the phase adjustment shifts for the time zones with a positive offset from UTC is positive and is negative for the negatively offset time zones.

Thus when media frame labels are represented in the HH:MM:SS;FF format, the label will shift by the hours and minutes value of the time zone shift. The day boundaries of the media time label will shift slightly relative to the calendar day. For time zones with a negative UTC offset the media Frame Zero may be just before midnight for some calendar days.

If standard time/daylight saving time shifts are mandated to the local time by the appropriate governing authority, they typically take effect in the early hours of the day; typically at 01:00 AM or 02:00 AM. These shifts are achieved by changing the UTC timescale offset.

Due to the current practices in the standards and by local governments, it is not anticipated that a leap second correction and a standard time/daylight saving time shift will occur on the same calendar day; however this possibility is supported.

Each ordinary day has a constant duration of 24 hours or 86400 seconds and may be formatted with the hours (HH) count 00 to 23, the minutes (MM) count 00 to 59 and the seconds (SS) count 00 to 59. Thus the range of values is from 00:00:00 to 23:59:59. Optionally, there may be a sub-seconds value at the end after the integer seconds.

For special days when there is a leap second correction, the count is modified to place the correction at the end of the day. For a positive leap second insertion, the seconds for the last minute of the day counts 00 to 60 or exceptionally for a negative leap second the count is from 00 to 58 and there are 86401 or 80399 seconds in that day, respectively.

There are now detailed some of the benefits provided by the method described herein.

Simplified calculations: It is significant to note that the equations generally produce calculations that involve integer calculations with relatively small values to produce an integer value (often with a value from 0 to 1000) that is multiplied by a fixed rational number.

Deterministic and reversible calculations: The system is fully deterministic so that it is possible to convert from a point in time on one timescale to a corresponding point on another scale and to then convert back to the original time point. For example; a clock time may be converted to a frame label and then independently back to a clock time.

For each calendar day there is a deterministic count that has the same count range in all time zones. There is thus a linear conversion from a media label in one time zone to a similar label in another time zone.

The conversion to a time address label in the SMPTE ST 12-1 is possible: all of the counts are unique with no duplications.

The process fully and deterministically accounts for differences between the clock timescales and the media label scales. Once started, the count sequence can run forever without the need for corrections or adjustments other than those described herein.

There is now summarized the media alignment and labeling method.

A midnight (start-of-day) is chosen as a stated reference calendar day (Day-Zero). A signal alignment epoch is a point in time where the media signals have a defined zero phase alignment offset. If this alignment epoch is the same as the Day-Zero midnight, then the signals are defined as having a zero offset at this point in time. If the signal alignment epoch is different, there will be alignment phase offsets (Origin Offset) at the Day-Zero midnight.

For 1001-related rate media, it is shown that if media is aligned (zero phase offset) at a point in time, then there is a cycle of 1001 time intervals (1001 seconds, 1001 minutes, 1001 hours or 1001 days) where there are a deterministic patterns of phase shifts over these cycles and the phase offsets will return to zero at the end of the 1001 time intervals.

On each step the offset assumes one of 1001 discrete values. These values are assigned a Phase-Number from zero to 1000.

Although the sequence of phase offsets at midnight may not have an apparent order, the sequence is just the same a deterministic ordered set of phase offsets and this is defined by a mathematical relationship as shown above. There is a step for relating the sequence to the Phase-Numbers and thus which of the 1001 phase offset values that will apply to that cycle of the sequence.

If a frame is aligned (zero phase offset) at midnight, then at subsequent midnights the phase offsets will assume one of the 1001 regularly spaced discrete offset values and that on the 1001th day the offset will again be zero (aligned to midnight). This presumes no interruption of the timescale with 86400 seconds in a day.

Since there is not an integer number of media units in a 24 hour calendar day, some days will have more media units starts in that day and others will have less. The number of media index counts that will begin between midnights for each day can be determined.

If the clock time base is shifted by an integer number of seconds (i.e. a leap second insertion), the phase offset at midnight will still be one of the set of 1001 values but is just at a different point in the ordered sequence of phase values. The method takes this into consideration when determining the phase alignment number.

Similarly, the shifting of the epoch will shift the sequence by a number of steps and that shift is taken into account by the method as presently described.

The process of determining the media labels for a given clock timestamp is deterministic and these labels may thus be converted back to a clock timestamp value. The method provided a simple way to determine the media phase alignment for any second of the day.

There is described below the apparatus that can be used to generate reference signals, which in turn may be used to generate media signals, and which are in conformance with the specified epoch alignment norms.

To achieve a deterministic, repeatable and precise method of labeling video, audio and other media with a time related label a plurality of methods are used separately and collectively in the process.

The methods is used to facilitate the generation of the video, audio and other types of media with their alignments such that the media is time-aligned in the manner where the media signals would have been phase aligned with specified phase alignments at a specified Media Epoch.

For video at fractional rates such as 30/1.001 Hz the number of frames in a day is not an integer number. A media frame block is attributed to a day if it begins within the day. Thus some days will have either fewer or more media index counts attributed to that day. Formulae and methods are defined for the deterministic definition of the number of media index counts as a function of the calendar date.

The methods described are applicable to video media at a frame rate of 30/1.001 Hz. Similar methods are applicable to media at rates of 24/1.001 Hz, 25/1.001 Hz and also integer multiples of these rates.

Time and date may be derived from a number of sources. For the purposes of implementation, as described below, the time and date are formatted as date in days from Day-Zero and time-of-day in seconds and sub-seconds. Day-Zero is the day of the media reference point in time. Date and times may be converted from other time and date formats to the desired format by methods known to persons knowledgeable in the art.

An apparatus creates and aligns reference timing signals to facilitate the generation and alignment of media signals that conform to their standards and which are aligned according to standards for alignment relative to a defined Media Epoch.

Media labels may be deterministically converted to character-based formats for human display and communication with legacy systems. These signals can be converted back to a timestamp in the form of a date and the time-of-day or other formats as required. The media is typically associated with a time interval that spans the time when the image or sound was captured and each media unit is labeled with a time related value, the media label. For media that is communicated as a serial signal, the label is typically associated with a reference point in the serial signal transmission that is near the beginning of the media frame transmission. For media that is stored as a file, the media label relates to the whole media unit unless otherwise specified.

The development is described from the development of the formulae to application of the formulae and to the development of an apparatus to generate aligned media signals.

Figure 12:
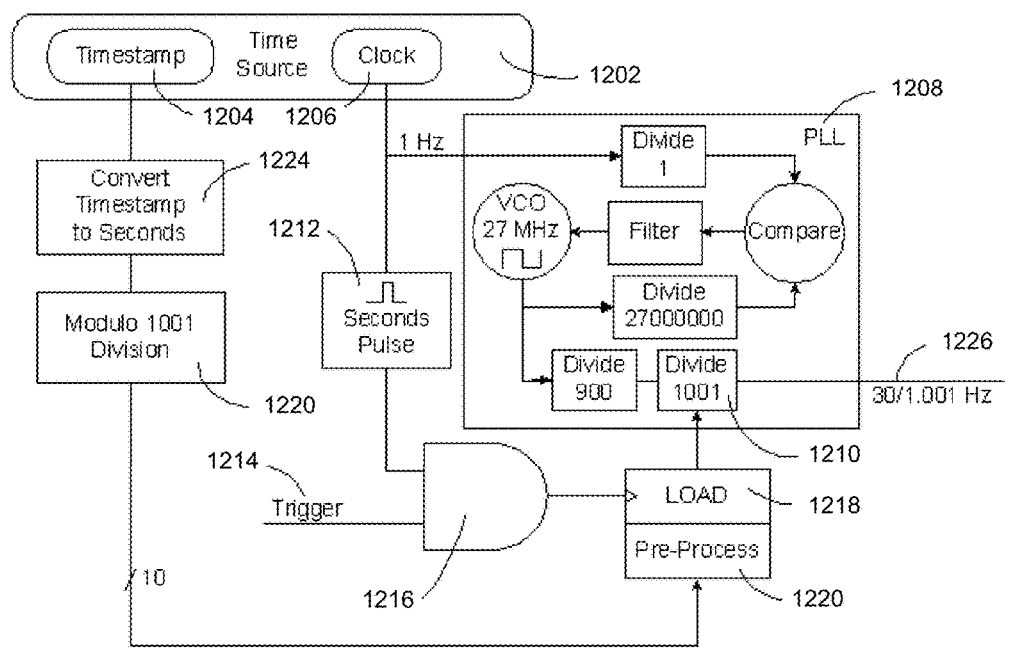
FIG. 12 is a block diagram illustrating an apparatus for generating 30/1.001 Hz media alignment signals, according to an embodiment.

Now referring to FIG. 12, a block diagram illustrates an apparatus for generating a clock references signal that can be used to phase align media signals at 30/1.001 Hz with respect to an epoch (i.e., a reference), according to an embodiment. The apparatus shown in FIG. 12 comprises a phase locked loop, counters and computational and logic elements.

The input to the apparatus is from the Time Source (1202) that provides a timestamp (1204) and a clock reference signal (1206). The timestamp is converted (1224) to a count of seconds from the epoch. From this seconds count the remainder after modulo 1001 division is calculated (1222). From the clock reference signal a phase lock loop counter (1208) generates a clock phased to the input clock. A part of the PLL a divisor chain includes a Divide by 1001 down counter (1210). From the source clock a seconds pulse (1212) is generated and this pulse is gated, with a gate (1216), by an external trigger (1214) to load (1218) the pre-processed modulo 1001 seconds count (1220) into the counters (1210). The Pre-processing (1220) may accommodate phase adjustments necessary to accommodate phase shifts elsewhere in the overall system. The result is to synchronize the counters (1210) with the timestamp. The output of the PLL is a timing signal suitably phased to synchronize the generation of the media signal. Designers knowledgeable in the art can make suitable adjustments to accommodate different decoding of the count values to suit specific local requirements. This timing signal (1226) may be used to synchronize various stages of the media signal generation processes.

Operation of this synchronization process need only happen once since the process fully corrects for the differences between the clock timescale and the media timescale. Provision can be made to re-sync the process as required or to provide a daily re-sync coincident with a daily jam process to assure reliable operation in case unexpected disturbances do occur.

Analog Color Black video reference signals at the 30/1.001 Hz frame rate in accordance with SMPTE standard ST 318 can include a Ten-field reference waveform that identifies the ten field (five frame) sequence. The ten fields of this sequences can identified with a zero based integer index With this sequence initialized at its first waveform (index zero) aligned at the Media Epoch the value of this index for the video frame at or immediately following any integer seconds point in time can be determined from the media alignment Phase-number using Equation 20 in FIG. 4.

Apparatus and Method for Determining the Phase Alignment of Media Frames

It has been demonstrated that phase alignments repeat in a deterministic sequence with respect to time in 1001 cycles of seconds, minutes, hours and days. The methods here use the source time clock cycles to generate the necessary clock reference signals.

Figure 13:
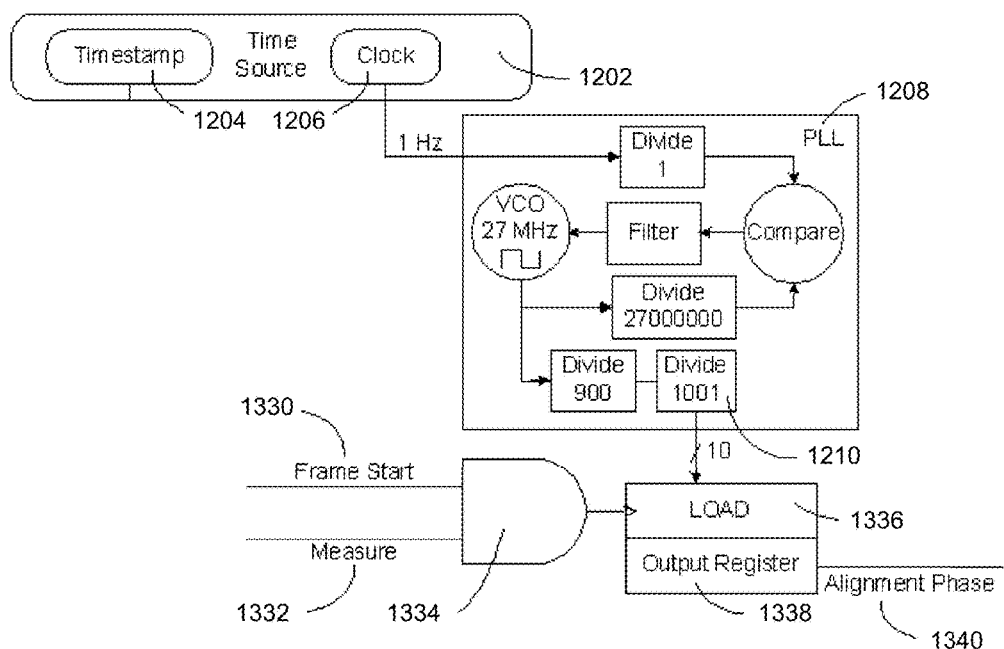
FIG. 13 is a block diagram illustrating an apparatus to measure phase alignment of media signals, according to an embodiment.

Now referring to FIG. 13, a block diagram illustrates an apparatus that can be used to determine the phase-number of the media alignment of a media frame at a point in time, according to an embodiment. The apparatus shown in FIG. 13 comprises a phase locked loop, counters and computational and logic elements.

This embodiment of the apparatus is different from the embodiment depicted in FIG. 12. The input to the apparatus is from the Time Source (1202) that provides a timestamp (1204) and a clock reference signal (1206). From the clock reference signal, a phase lock loop (PLL) generates a system clock phased to the input reference (1206). This clock is divided by a divisor chain that includes a Divide by 1001 counter (1210). The results of these counts are loaded (1336) into an output register (1338) at a media frame start enabled by external logic. The resulting alignment phase value (1340) is a combination of the alignment phase value that is a result of system variations and jitter (as shown in FIG. 13), which is determined from a frame start (1330) and a measure (1332) and gated (1334).

Those who are skilled in the art will understand that suitable modifications can be made to accommodate particular implementation differences.

There is now described an application to identifying media signal frames with time related labels.

On a day to day basis, video at a frame rate of 30/1.001 Hz will have different phase alignments to midnight. This method founded on date based calculations produces a Phase-Number that identifies each of these 1001 discrete phases and these phases are numbered from zero to 1000. The method accommodates the introduction of clock timescale discontinuities, such as leap second corrections. Shifting between standard time and daylight saving time is accommodated by a change of the UTC offset timescale.

There are three basic steps in the determination of the Media Index and the Day-Number:
  1) Convert the timestamp to a Day-Number and a TOD. The Day-Number is a zero based count of UTC calendar days from the Day-Zero reference. The Timestamp may be expressed in the form of a count of seconds and a sub-seconds count from the IEEE STD 1588 PTP epoch. The PTP epoch is midnight at 1970-01-01T00:00:00TAI. For the application of the IEEE 1588 PTP Epoch as the Media alignment epoch, this point in time is on the TAI timescale and is 10 seconds before 1970-01-01 midnight on a proleptic UTC timescale. This 10 second offset is discounted in the calculation of the Day-Number. It should be noted that from 1970 to 1972 the UTC timescale is officially at a rate slower than the SI second. For ease of computation a proleptic timescale using the SI second is used here. This is the similar approach to that used by most modern timekeeping systems. Stated differently the TAI 1970 epoch is 63,072,010 seconds SI before 1972-01-01T00:00:00Z (midnight UTC Zulu). Alternately the Timestamp may be expressed as the Modified Julian Day (MJD) and the time in the form of a count of seconds and sub-seconds from midnight. If the Timestamp is not in one of these formats a conversion will be required. The formulae support other choices for the origin. Day-Numbers for other days and also the Time-of-Day can be calculated using methods known to persons knowledgeable in the art. The Time-of-Day (TOD) is a count of seconds and sub-seconds count from midnight.

2) From the Day-Number determine: the number of media counts in the day, and the offset to the first frame block.
3) From the TOD determine: the media index.

The method for day labeling as a media alignment index is shown in FIG. 4.

By calculating and analyzing the alignment phase of 30/1.001 Hz video frames relative to midnight, there was found the method shown in FIG. 4.

There is now described an apparatus for generating a media index label that has a deterministic relationship to clock time.

Referring to FIG. 14, a table illustrates a method for formatting and calculating timestamp values to be used to calculate phase numbers and other time related label data, according to an embodiment.

Referring to FIG. 15, a flowchart illustrates a method for generating UTC-related media labels, according to an embodiment.

The process is outlined in FIG. 15 and equations are in FIG. 4 and FIG. 14. Video frames or media units are assigned an integer media index label number.

Figure 9:
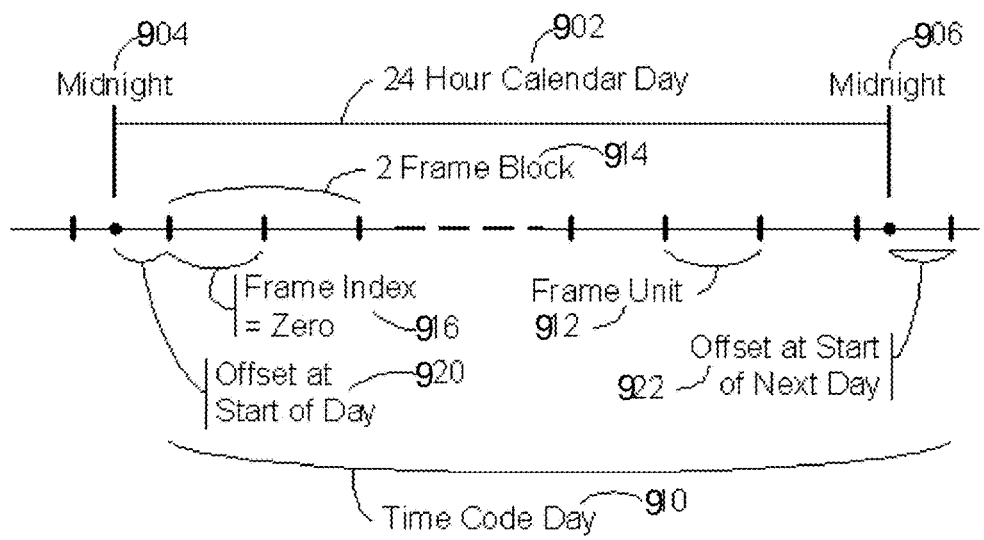
FIG. 9 is a diagram illustrating elements of a time code day and alignment to a calendar day, according to an embodiment.

Referring to FIG. 9, a diagram illustrates elements of a time code day and alignment to a calendar day, according to an embodiment. There is shown a pictorial representation of time in a 24-hour calendar day (902) and the alignment to media elements for the corresponding time code day (910).

As shown in FIG. 9 the first frame block that starts near midnight, i.e., the day-origin (904), with a start-of-day offset (920), is assigned the number zero (916). Subsequent frames are assigned monotonically incrementing numbers (912) up to the last frame, or more rigorously the last frame of the last frame block (914), in the calendar day (902) before midnight, i.e., the day-origin (906) of the following day at which there is a new start-of-day offset (922). The methods and procedures of section above entitled "Apparatus and Method for Determining the Phase Alignment of Media Frames" can be used to generate media signals with the media frames aligned to the epoch.

For media at a rate of 30/1.001 Hz the algorithms and processes shown FIG. 4 and FIG. 5 determine if a day is to be designated as a Short-day or a Long-day and thus the number of media index counts in a day:

1) Short-day label numbers will range from 0 to 2,589,409 for a total of 2589410 media index counts.
2) Long-day label numbers will range from 0 to 2,589,411 for a total of 2,589,412 media index counts.
3) On positive leap second correction days these count ranges are increased by 30 counts.
4) On negative leap second correction days these count ranges are reduced by 30 counts.

The media index is a zero based count of frames. To determine the media index label at a specific clock time:

5) Sample the local clock for the Time-of-Day at the beginning of the media frame.
6) Determine the Start-of-Day phase offset (see FIG. 4 Equation 10, Equation 12 and Equation 18)
7) Subtract the Start-of-Day phase offset from the Time-of-Day clock time.
8) Divide this time by the media frame rate. Since this clock time should be close to the media frame boundary the mathematical "ROUND" function should be used to avoid small precision errors.

This result is the media index label number.

There is now described an apparatus for converting the media index label to a SMPTE ST 12-1 time address label.

A method for converting an integer count of frames to a Time Address is defined in SMPTE Engineering Guideline EG 40. This method is used with the complementary methods for adding in the additional daily counts.

Traditional methods for correcting the Time Address by a Daily Jam process applied to the SMPTE ST 12-1 time address values at the Daily Jam time are equivalent to holding the count until synchronization is achieved or, at the Daily Jam time to stepping the count back by the required number of counts, or to forcing a set value into the time address. These traditional methods do not result in a deterministic count that may be reversed to always recover the original timestamp.

The method described herein defines a count conversion change that overrides the drop frame correction algorithm for the last minutes of the day. This produces a conversion that is completely identical to traditional practice, with the exception of the last two minutes of the day. In these two minutes, the two counts at the beginning of the second to last minute are conditionally not dropped (they may be included in the count sequence) and also at the beginning of the last minute of the day are not dropped. The result is a count sequence that totally compensates for the drift created by the fractional time base offset.

The steps in the process are: Based on the Day-Number determine the number of frame count corrections that are required. Then, use the formulae defined in SMPTE Engineering Guideline EG 40 to convert the count of media units into a Time Address label, with the following exceptions where a modified UCC Drop Frame algorithm must be applied as follows:

1) In the second to last minute of the day (hour 23, minute 58) if this is a Long-day the frame counts 00 and 01 shall be included in the Time Address count sequence and shall not be dropped as specified by the SMPTE ST 12-1 drop frame count algorithm.
2) In the last minute of the day (hour 23, minute 59) the frame counts 00 and 01 shall be included and not dropped as specified by the drop frame count algorithm.

Alternately, if this method is not feasible and it is desired to make the correction at the Daily Jam time the count may be held for two counts for a Short-day or four counts for a Long-day. On days when there is a leap second correction this change may be affected at the same time.

There is now described how to recover the timestamp value from the media time related label.

Media Time Related Labels are created by the relationship of the media to time. For many applications there is a requirement to recover the source timestamp that was the basis of creating the media label. The media label may exist in different formats such as the SMPTE ST 12-1 Time and Control Code or as a TRL integer count of media units either from midnight or from the Media Epoch. Where the media label is in the form of a SMPTE ST 12-1 Time and Control Code, it is first converted to an integer count from midnight.

The process is outlined in FIG. 16, a flowchart which illustrates a method for recovering date and timestamps from ST 12-1 time and control code, according to an embodiment.

There is now described a method for converting a time address label back to an integer count label.

The SMPTE ST 12-1 Time and Control Code includes media index in the form of a Time Address, format metadata and can also include a date coded in the Binary Groups according to SMPTE standard ST 309.

From the data encoded in the Binary Groups of the ST 12-1 Time and Control Code, determine the calendar date. The date may have been coded either as years, months and days (YYMMDD) or as a Modified Julian Date (MJD). A person skilled in the art may convert this date to the desired format of an integer day count (Day-Number) from the Media Day-Zero.

From the Day-Number, determine if this is a Long-day or a Short-day using the process detailed herein.

Use the formulae defined in SMPTE Engineering Guideline EG 40 to convert the Time Address label into a count of media units based on the resulting media index and its relationship to the Daily Correction Time. If the Time Address label value is within the last two minutes of the day, a modified procedure is used to account for the additional counts that may be present in the count sequence at the beginning of the last two minutes.

If this is a Long-day, then an additional two counts (00 and 01) are expected at the beginning of the second to last minute (hour 23, minute 58), and the appropriate modification to the calculations must be made.

If this is a Long-day or a Short-day, then an additional two counts (00 and 01) are expected at the beginning of the last minute (hour 23, minute 59), and the appropriate modification to the calculations must be made.

There is now described an apparatus to convert an integer media index label to a clock timestamp.

The Time Related Label (TRL) comprises data components that relate to the labeling of discrete media units or frames and also metadata that relates to the TRL structure and common parameters. This metadata may be included as part of the TRL or may be implicit through the context of the media or its transport.

In addition to the Media Index count, recovery of a calendar date and timestamp needs certain metadata to be available. The media or frame rate must be known to be constant and precise in relation to a specified phase alignment at a point in time, the Media Epoch.

The UTC timescale progresses at a constant rate based on the second, however leap second corrections are made periodically on dates as determined by the Bureau International des Poids et Mesures (BIPM) and these corrections are announced at least eight weeks in advance by the International Earth Rotation Service (IERS). Leap second corrections are officially applied to the UTC timescale at the last second of a month just before midnight. The IERS publishes leap second announcement and historical data is available on their Internet web site currently at www.iers.org.

Now referring to FIG. 7, a table illustrates leap seconds for 30/1.001 Hz two-frame block media with PTP phase alignment, according to an embodiment. There is shown a tabulation of leap-second related data for a media epoch alignment at the PTP epoch of 1970-01-01T00:00:00TAI.

Referring to FIG. 8, a table illustrates leap seconds for 30/1.001 Hz two-frame block media with 1972 phase alignment, according to an embodiment. There is shown a tabulation of leap second related data for a media epoch alignment at UTC midnight of 1972-01-01T00:00:00Z.

The tables in FIG. 7 and FIG. 8 list the dates and accumulated leap second correction related values. The Date (702, 802) in the table is the date of the first day after the leap second correction and the Leap Second in Effect (704, 804) is the value beginning at the start of that day. The points in time in these tables provide reference points that are used to calculate the correspondence between media labels and points in time for times between leap second insertions. In addition the table illustrated certain parameters that may be used to calculate the timestamp that corresponds to a TRL Media Index value. These other parameters in the tables may be calculated from the Date and Leap Seconds in Effect parameters and these data parameters may be dependent on the alignment epoch and the media rate. The values in the table are shown for video media at a frame rate of 30/1.001 Hz with a two frame block alignment to the Epoch. The Days since Epoch (706, 806) is a count of calendar days from the Media Epoch. The Seconds since Epoch (708, 808) is a count of seconds from the Epoch. The Phase-Number (710, 810) is a measure of the media frame block alignment at the start of the day and may calculate using the procedures in FIG. 4 as previously described. The Phase-Number may be converted to values expressed in Frames (712, 812) and Seconds (714, 814). The first Frame of the Day (716, 816) is the Media Index value that is associated with the first frame of the first frame block of the day. These relationships are illustrated in FIG. 9.

Media Index Label information may be in the form of either:

1) a count of frames from the Epoch;
2) a day count from an epoch and an Index count from midnight; or
3) a date and an Index count from midnight.

In addition, the frame rate, Epoch date, and time zone offset are assumed to be known.

The method detailed below may be used to determine the calendar date and time of day (ToD) timestamp that corresponds to the alignment point of the media unit. These Calendar Date and ToD_Seconds values may be converted to the desired Timestamp format using methods known to users knowledgeable in the art.

There is now described a method for recovering the clock timestamp from a TRL.

The media is presumed to have been phase-aligned at the Media Epoch. The Media Index may be expressed as a count of frames from midnight of the day or as a count of frames since the epoch. For a count since midnight the days since the epoch may be expressed as a number of days or as a calendar date.

Since leap second corrections are not determined by a mathematical formula it is necessary to use a lookup table or similar process to determine the points in time when the corrections were applied. Representative tables are shown in FIG. 8 for alignments at midnight of 1972-01-01 and in FIG. 7 for alignment at the IEEE 1588 PTP epoch.

The examples here are shown for 30/1.001 Hz video with a two frame block cadence.

There is now described a timestamp from a media index as a frame count since the media epoch.

1.1. From the appropriate leap second table in FIG. 7 or FIG. 8 select the row that has the largest First Frame of Day (16) value that is not greater than the Frame Count being searched.

1.2. Subtract the First Frame of Day (16) value from the Frame Count to yield the number of frames since the last leap second correction.
1.3. Divide this number of frames value by the frame rate (30/1.001 frames per second) and add the FrameTimeOffset-Seconds (14) to yield the elapsed seconds (ES).
1.4. Calculate the number of days that have elapsed since the last leap second correction with the formula:

Days_since_$LS$=FLOOR($ES$,86400).

1.5. With the Date (02) from the selected table row calculate the calendar date with the formula:

Calendar Date=Date+Days_since_$LS$ 1.6. Calculate the time elapsed since midnight with the formula:

ToD_Seconds=$ES$%86400

There is now described a timestamp from media index as a day count from the media epoch plus frame count from midnight.
2.1. From the appropriate leap second table in FIG. 7 or FIG. 8 select the row that has the largest Day-Number (06) value that is not greater than the Day Count being searched. Select the Leap Seconds in Effect (LSE) (04) value from that row.
2.2. Calculate the media calendar date with the formula:

Calendar Date=Day-Zero Date+Day Count 2.3. Calculate the Phase Alignment frames offset at the beginning of the day with the formula:—

Phase Offset=(((Day Count×706)+(LSE×15))
    %1001)×(2/1001).

2.4. Calculate the time elapsed since midnight with the formula:

ToD_Seconds=(Frame Count+Phase Offset)/(30/
    1.001)

There is now described a timestamp from media index as a date plus frame count from midnight.
3.1. Calculate the Day Count since the epoch with the formula:

Day Count=Date−Day-Zero Date 3.2. From the appropriate Leap Second table in FIG. 7 or FIG. 8 select the row that has the largest Date (02) value that is not greater than the Date being searched. From the leap seconds (04) column this indicates the value of leap seconds in effect (LSE).
3.3. Calculate the Phase Alignment frames offset at the beginning of the day with the formula:

Phase Offset=(((Day Count×706)+(LSE×15))
    %1001)×(2/1001).

3.4. Calculate the time of day with the formula:

ToD_Seconds=(Frame Count+Phase Offset)/(30/
    1.001)

These Calendar Date and ToD_Seconds values may be converted to the desired Timestamp format.

There is now described a method for converting an integer count label back to a timestamp (clock time).

From the date, determine the Day-Number as the number of days from the media Day-Zero. Then, from the Day-Number calculate the media phase alignment offset at the beginning of the day. Thereafter, calculate the Time-of-Day with the formula in FIG. 14, Equation 12.

The methods and apparatus described herein may also apply to other 1.001-related rates such as 24/1.001, 25/1.001 and integer multiples of these rates.

It should also be understood that a media frame sampled at an integer multiple of a media base frame rate has a day count origin which starts at the day phase offset for a media frame at the media base frame rate. For example, if the media base frame rate is 30 Hz/1.001, the maximum day phase offset is about 33 ms. If a higher frame rate is also used, for example 60 Hz/1.001 or 120 Hz/1.001, which are integer multiples of 30 Hz/1.001, the maximum day phase offset is about 16 ms or 8 ms, respectively, but will nonetheless be set at the maximum day phase offset of the lowest of the rates, i.e., the media base frame rate (about 33 ms in this example).

The following table is a numeric example of an embodiment of the method.

| Steps | Numeric example |
| --- | --- |
| A method for generating a frame label for a media frame sampled at a media frame rate at a given time-of-day relative to a time zone offset from UTC and relative to a day-zero, the method comprising: | media frame rate = 30/1.001 with two frame block. time-of-day = 11:05:23 time zone offset UTC = −5:00 (EST) media epoch = 1970-01-01 00:00:00 TAI |
| 1.1 - getting a calendar day at which the media frame was sampled, the calendar day having a day origin; | Calendar Day (902) = calendar day = 2015-11-14 Midnight (904) = By definition day origin = midnight |
| 1.2 - determining the number of calendar days since the day-zero; | This day = 2015-11-14 = 57340 MJD Day-Zero = 1972-01-01 = 41317 MJD Day-number = 16023 Note: MJD = Modified Julian Date |
| 1.3 - determining a day-origin phase offset at the day origin based on the media epoch reference, the UTC timescale and on the calendar day; | Equation 10 (FIG. 4) Phase alignment UTC = (63072010 × 15 + 16023 × 706 + (36 − 10) × 15) % 1001 = 342 Equation 18 & Offset (920) for UTC 342 × (2/30000) + 0.022800 s |

-continued

| Steps | Numeric example |
|---|---|
| 1.4 - determining a day origin phase offset at a day origin based on the day-zero, a UTC timescale shift to a local time zone and on a calendar day; | Equation 12 (FIG. 4)<br>Phase alignment UTC-5 =<br>342 +<br>(−1)<br>(× ((5 × 54) % 1001) +<br>((0 × 101) % 1001)) =<br>342 − 270 =<br>72<br>Equation 18 (FIG. 4) & Offset (920) for UTC-5<br>72 × (2/30000) + 0.004800 s |
| 1.5 - determining a number of media units in a calendar day based on a number of calendar days since a reference calendar day and a length of the calendar day in seconds; | From Equation 10 above<br>Phase alignment (UTC) = 342.<br>Not a leap second adjustment day therefore Calendar day = 86400 s<br>From steps in FIG. 5<br>Not a Leap second insert day<br>& 342 is not <295<br>Therefore Short day 2589410 Counts<br>Labels (0 to 2589409)<br>UCC Correction +2 frames |
| 1.6 - subtracting the day-origin phase offset from the time-of-day to get a media frame relative offset which is relative to a first frame of the calendar day; and | time-of-day = 11:05:23<br>(11 × 3600) + (5 × 60) + 23 =<br>39923 s<br>media frame relative offset =<br>39923 − 0.004800 =<br>39922.995200 |
| 1.7 - determining the frame label from the media frame relative offset and from the media frame rate. | frame label (912) =<br>int(39922.995200 × (30/1.001)) =<br>1196493 |

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method for generating a frame label for a media frame sampled at a media frame rate at a given time-of-day relative to a day-zero reference, the method comprising:
   obtaining a calendar day at which the media frame is sampled, the calendar day having a day origin;
   computing a day-origin phase offset at the day origin based on the day-zero reference and on the calendar day;
   subtracting the day-origin phase offset from the given time-of-day to get a media frame relative offset which is relative to a first frame of the calendar day;
   computing the frame label from the media frame relative offset and from the media frame rate; and
   assigning the frame label to the media frame for temporal-positioning the media frame with respect to other media frames and with respect to a timescale.

2. The method of claim 1, wherein determining the frame label comprises numbering media frames on the calendar day from zero up to a total number of frame counts per calendar day.

3. The method of claim 1, wherein the media frame is sampled at one of the following media frame rates or an integer multiple thereof:
   30 Hz divided by 1.001;
   25 Hz divided by 1.001; and
   24 Hz divided by 1.001.

4. The method of claim 1, wherein the media frame is sampled at a media frame rate of 30 Hz divided by 1.001, the method further comprising calculating a total number of frame counts per calendar day, the total number of frame counts comprising 2,589,408 frame counts plus a correction.

5. The method of claim 1, wherein determining a day-origin phase offset comprises:
   determining a number of days between the calendar day and the day-zero reference;
   multiplying the number of days by a day-index to phase-number conversion factor; and
   calculating a remainder of a division by 1001.

6. The method of claim 5, wherein multiplying the number of days by a day-index to phase-number conversion factor comprises multiplying the number of days by:
   411 if the media frame rate is 30 Hz divided by 1.001 and the media frame is in a one-frame block;
   706 if the media frame rate is 30 Hz divided by 1.001 and the media frame is in a two-frame block;
   843 if the media frame rate is 25 Hz divided by 1.001 and the media frame is in a one-frame block;
   461 if the media frame rate is 25 Hz divided by 1.001 and the media frame is in a four-frame block;
   529 if the media frame rate is 24 Hz divided by 1.001 and the media frame is in a one-frame block; and
   706 if the media frame rate is 24 Hz divided by 1.001 and the media frame is in a two-frame block.

7. The method of claim 5, further comprising determining whether the calendar day is a long day or a short day.

8. The method of claim 7, wherein determining whether the calendar day is a long day or a short day comprises determining whether the day-origin phase offset is smaller than a long-day phase-number threshold or not smaller than the long-day phase-number threshold, respectively, wherein the long-day phase-number threshold is:
   590 if the media frame rate is 30 Hz divided by 1.001 and the media frame is in a one-frame block;

295 if the media frame rate is 30 Hz divided by 1.001 and the media frame is in a two-frame block;
157 if the media frame rate is 25 Hz divided by 1.001 and the media frame is in a one-frame block;
540 if the media frame rate is 25 Hz divided by 1.001 and the media frame is in a four-frame block;
529 if the media frame rate is 24 Hz divided by 1.001 and the media frame is in a one-frame block; and
236 if the media frame rate is 24 Hz divided by 1.001 and the media frame is in a two-frame block.

9. The method of claim 7, further comprising determining if the calendar day is a leap-second insert day, wherein determining whether the calendar day is a long day or a short day comprises:
if the calendar day is not a leap-second insert day, determining whether the day-origin phase offset is smaller than a long-day phase-number threshold or not smaller than the long-day phase-number threshold or not smaller than the long-day phase-number threshold or not smaller than the long-day phase-number threshold, respectively; or
if the calendar day is a leap-second insert day, determining whether the day-origin phase offset is smaller than a leap-second-insert phase-number threshold or not smaller than the leap-second-insert phase-number threshold, respectively,
wherein the long-day phase-number threshold is:
590 if the media frame rate is 30 Hz divided by 1.001 and the media frame is in a one-frame block;
295 if the media frame rate is 30 Hz divided by 1.001 and the media frame is in a two-frame block;
157 if the media frame rate is 25 Hz divided by 1.001 and the media frame is in a one-frame block;
540 if the media frame rate is 25 Hz divided by 1.001 and the media frame is in a four-frame block;
529 if the media frame rate is 24 Hz divided by 1.001 and the media frame is in a one-frame block; and
236 if the media frame rate is 24 Hz divided by 1.001 and the media frame is in a two-frame block, and
wherein the leap-second-insert phase-number threshold is:
560 if the media frame rate is 30 Hz divided by 1.001 and the media frame is in a one-frame block;
280 if the media frame rate is 30 Hz divided by 1.001 and the media frame is in a two-frame block;
133 if the media frame rate is 25 Hz divided by 1.001 and the media frame is in a one-frame block;
754 if the media frame rate is 25 Hz divided by 1.001 and the media frame is in a four-frame block;
448 if the media frame rate is 24 Hz divided by 1.001 and the media frame is in a one-frame block; and
224 if the media frame rate is 24 Hz divided by 1.001 and the media frame is in a two-frame block.

10. The method of claim 9, wherein the media frame is sampled at 30 Hz divided by 1.001 and the media frame is in a two-frame block, wherein calculating a total number of frame counts per calendar day comprises adding a correction equal to:
+2 if the calendar day is a short day and not a leap-second insert day;
+4 if the calendar day is a long day and not a leap-second insert day;
+32 if the calendar day is a short day and a leap-second insert day; and
+34 if the calendar day is a long day and a leap-second insert day.

11. The method of claim 1, wherein determining the frame label of the media frame comprises:
determining a number of seconds between the day origin phase offset and the given time-of-day; and
dividing the number of seconds by the media frame rate to produce a media label count value.

12. The method of claim 1, wherein a clock time source for the calendar day and the given time-of-day is one of:
a IEEE 1588 Precision Time Protocol (PTP);
a Network Time Protocol (NTP);
a Global Positioning System (GPS); and
a SMPTE ST 12-1 Time Code with date formatted per SMPTE ST 309.

13. The method of claim 1, wherein media are defined as being aligned at a media epoch reference, the media epoch reference being the SMPTE Epoch of 1970-01-01T00:00:00 on a TAI timescale.

14. The method of claim 1, wherein the day-zero reference is 1972-01-01 on a UTC timescale.

15. The method of claim 1, wherein computing a day-origin phase offset comprises determining a local clock time shift resulting from the onset or retreat of daylight saving time which results in a shift of a local time offset which matches the one-hour daylight saving time shift.

16. The method of claim 1, wherein computing a day-origin phase offset comprises determining a change in a length of the calendar day resulting from a leap second adjustment which results in a corresponding change in a number of media frame counts representing one second at the media frame rate.

17. The method of claim 1, wherein a media frame sampled at an integer multiple of a media base frame rate has a day count origin which starts at the day-origin phase offset for a media frame at the media base frame rate.

18. The method of claim 4, wherein determining the day-origin phase offset is based on a time zone offset from UTC.

19. An apparatus for generating alignment reference signals for aligning media signals at a media signal rate at a given time-of-day relative to a day-zero reference, the apparatus comprising:
a clock source for obtaining the given time-of-day and a calendar day at which the media signal is sampled, the calendar day having a day origin;
a PLL oscillator for determining a day-origin phase offset at the day origin based on the day-zero and on the calendar day, and for subtracting the day-origin phase offset from the given time-of-day to determine a media signal relative offset which is relative to a first media signal of the calendar day;
a computing device, operably connected to the clock source and to the PLL oscillator, for computing the media signal label from the media signal relative offset and from the media signal rate; and
a memory, operably connected to the computing device, for storing the media signal label assigned to the media signal, for temporally aligning a media signal with respect to other media signals and with respect to a timescale, prior to outputting the media signal from a computer.

* * * * *